(12) United States Patent
Daoura et al.

(10) Patent No.: US 9,961,523 B1
(45) Date of Patent: May 1, 2018

(54) DEVICES AND NETWORK ARCHITECTURE FOR IMPROVED BEACON-MEDIATED DATA CONTEXT SENSING

(71) Applicant: PB, Inc, Renton, WA (US)

(72) Inventors: Daniel J. Daoura, Renton, WA (US); Nick L Pearson-Franks, Renton, WA (US)

(*) Notice: Subject to any disclaimer, the term of this patent is extended or adjusted under 35 U.S.C. 154(b) by 0 days. days.

(21) Appl. No.: 15/180,080

(22) Filed: Jun. 12, 2016

Related U.S. Application Data

(60) Provisional application No. 62/175,141, filed on Jun. 12, 2015.

(51) Int. Cl.
| | |
|---|---|
| *H04B 7/00* | (2006.01) |
| *H04W 4/18* | (2009.01) |
| *H04W 4/00* | (2018.01) |
| *H04W 4/12* | (2009.01) |
| *H04W 84/18* | (2009.01) |

(52) U.S. Cl.
CPC ........... *H04W 4/185* (2013.01); *H04W 4/008* (2013.01); *H04W 4/12* (2013.01); *H04W 84/18* (2013.01)

(58) Field of Classification Search
CPC ..... H04W 4/008; H04W 4/023; H04W 4/025; H04W 4/027; H04W 4/06
USPC .............................................. 455/41.2–41.3
See application file for complete search history.

(56) References Cited

U.S. PATENT DOCUMENTS

| | | | | |
|---|---|---|---|---|
| 9,204,251 | B1* | 12/2015 | Mendelson | .............. G08G 1/14 |
| 9,485,716 | B2* | 11/2016 | Seok | ..................... H04W 48/14 |
| 2009/0268652 | A1* | 10/2009 | Kneckt | ............. H04W 52/0235 370/311 |
| 2015/0262117 | A1* | 9/2015 | Li | ........................ G06Q 10/087 235/385 |

(Continued)

*Primary Examiner* — Simon Nguyen
(74) *Attorney, Agent, or Firm* — Kal K Lambert; Lambert Patent Services LLC

(57) ABSTRACT

Architectures, devices, systems and methods incorporating beacon transmissions that comply with a defined communications protocol having frames corresponding to a universally unique identifier (UUID) value, a major value, and a minor value, in which the transmissions incorporate sensor data encoded on the fly into one or more of the values or frames of the protocol. Sensor data may include temperature, light intensity, smoke, voltage, sound, motion, displacement, acceleration, humidity, pressure, radiation, button-press stimulus event, compass direction, proximity, or other stimuli or sensor data, for example, and is more generally termed "contextual content". According to relationships and permissions established by a receiving device and/or system, look-up results are processed to configure notifications tied to the contextual content of the broadcast. Notifications to a receiving device and/or system are configured according to contextual data broadcast by the beacon. Beacons having the improved communications protocol may be deployed individually or in networks. The beacon broadcast may be accessed by naïve devices, but bit overloading may also be used to prevent unauthorized systems from correctly interpreting the data. Thus the architectures, devices, systems and methods of the invention enable a beacon having nested levels of interaction dependent on context established by the beacon and the relationship established with a compatible receiver.

26 Claims, 20 Drawing Sheets

(56) References Cited

U.S. PATENT DOCUMENTS

| | | | |
|---|---|---|---|
| 2016/0085429 A1* | 3/2016 | Newby | G01S 1/68 |
| | | | 715/763 |
| 2016/0119320 A1* | 4/2016 | Bansal | H04W 12/12 |
| | | | 705/14.26 |
| 2016/0127875 A1* | 5/2016 | Zampini, II | H04W 4/043 |
| | | | 370/311 |
| 2016/0148270 A1* | 5/2016 | Vigier | G06Q 30/0267 |
| | | | 705/14.58 |
| 2016/0260301 A1* | 9/2016 | Miller | G08B 13/2417 |
| 2016/0323708 A1* | 11/2016 | Sahadi | H04W 4/023 |
| 2016/0323754 A1* | 11/2016 | Friday | H04W 16/28 |
| 2016/0330588 A1* | 11/2016 | Lee | H04W 4/025 |
| 2017/0006440 A1* | 1/2017 | Postrel | H04W 4/008 |

* cited by examiner

Back    AlertSetting

861 — General

Alert on Phone

Buzz on TD

Battery low warning

862 — Distance

TD has left the hive

TD is getting lost

TD out of reach

TD has returned

880 — Multi-function Button

Find Phone

888 — Take Picture

890 — Location Pairing

| | 892 — LAT. | LONG. — 893 | |
|---|---|---|---|
| 891 — work | -122.11 | 47.51 | |
| home | -122.12 | 47.52 | |

DEVICES AND NETWORK ARCHITECTURE FOR IMPROVED BEACON-MEDIATED DATA CONTEXT SENSING

CROSS REFERENCE TO RELATED APPLICATIONS

This application is related to and claims priority to U.S. Provisional Patent No. 62/175,141, filed 12 Jun. 2016, which is herein incorporated in full by reference for all purposes.

FIELD OF THE INVENTION

Wireless beacons having sensors for measuring contextual parameters and controllers for reporting sensor output by overloading beacon communications protocols.

GOVERNMENT SUPPORT

Not Applicable.

BACKGROUND

Beacon technology has recently been introduced for use in retailing. Using a smartphone intermediary for example, the owner of the smartphone, typically a customer, will receive an invitation, an offer, or other relevant information when the smartphone detects a retailer's beacon and is triggered to look up the beacon identifier on the cloud and receive associated content. In this way the merchant invisibly develops a special relationship with the customer that is activated whenever the customer is in a store where beacons are deployed, typically by a "didEnterRegion event" that occurs when the smartphone (or other wireless device) is in radio proximity to a beacon. Different interactions may occur depending on how close the customer is to the beacon. Standard beacons have an approximate range of 70 meters. More recently the technology has been modified to include a wireless payment service that operates in close proximity to the beacon.

In use, the beacon transmission is recognized by compatible receivers (typically a smartphone) such that the bit string values may be used to look up pre-selected information through an internet connection mediated by the smartphone or other mobile device. The information may include "push notifications" that contain advertising information a retailer wants to share with the owner of the mobile device. Beacons do not themselves push notifications to receiving devices. However, software in the mobile device may trigger the push notifications according to permissions established by the owner. The smartphone owner has the option of ignoring these notifications, locking the display, or engaging so as to take advantage of a special offer, for example. The various aspects of mobile device functionality are enabled or restricted by device "policies".

Beacons are configured to transmit a formatted string of frames or "values" at a fixed frequency and repeat rate. The transmission is read digitally at about 2.4 GHz and typically follows the Bluetooth low energy communications protocol. However, pairing is not required for the string to be received by a Bluetooth enabled device, which is generally transmitted without security features. A prefix in the transmission indicates the initiation of a bit string according to a recognized communications protocol; what follows is a unique universally identifier (UUID) that indicates the owner, supplier, logical group, or beacon type, followed by a major value and a minor value having information descriptive a particular beacon or class of beacons. Using a beacon configuration tool, the merchant will typically modify the major and minor values in the bit string to register or associate the beacon with a particular venue and a particular subspace in the venue. The major value may be used to indicate a specific store, for example of a franchise, and the Minor value may be used to identify a specific location within that particular store. Thus the string is conventionally used to identify the beacon, the beacon owner, and the beacon location. Aspects of conventional beacon technology are described in U.S. Pat. Nos. 8,676,182, 8,880,770, and 8,998,096 and in Australian Pat. Publ. Doc. AU 2012/101222, all of which are incorporated herein by reference.

Major and minor values may be shared in programs so as to group certain classes of beacons, enabling the developer to configure the whole class in a single programming step. During a beacon deployment, the major and minor values are established to meet the needs of the installer or operator, and thus are not dynamic and subject to change unless re-configured by operator intervention.

Similarly, the UUID is static and is registered to the device unless re-programmed. UUID naming is widely used in programming to identify a device owner, and the 128-bit structure was adopted as a standard to ensure a high level of uniqueness no matter how the UUID was generated. Methods for generating a UUID include for example concatenating the number of 100-nanosecond intervals since zero time on the Gregorian calendar with the MAC address of the computer that generates the UUID. Alternatively, UUIDs may be hashed from the developer's POSIX UID or GID and domain, or may be spliced together from a random number generator and a version number. Other proprietary hash functions may be used to derive a UUID from a domain name, object identifier or distinguishing name, and so forth. The entire purpose of this effort is to prevent inadvertent errors and hash collisions where a program ambiguously refers to two different devices having the same UUID, destabilizing the stack. The more the UUID is randomly selected, the less likely an error or collision will be.

Thus the beacon communication protocol has not evolved to share information directly, it has evolved to ensure that developers and owners may reliably apply attributes to particular devices or classes of devices without ambiguity, and that customers will be directed according to policies implemented in a compatible application to an internet website having information that relates to a unique beacon identified as being in proximity to the customer's mobile device and to no other (as a security means).

However, conventional uses are now being supplanted. Beacons may find household, business, and environmental uses not related to retail sales, such as tracking, finding, and monitoring, where the beacon is sensed by a device programmed to report or track its location. Art of this kind is described in U.S. patent Ser. No. 14/301,236 to Dauora, filed 10 Jun. 2014, which is co-owned and co-pending and which is incorporated herein in full by reference for all it teaches.

Once a beacon has been identified and located, it may be of practical value to ask the beacon to report on its environment or "context". But because beacons are supported by a highly resource limited computing platform, queries that involve bidirectional pairing may be impractical or limited by signal transmission crowding. Thus there is a need for a beacon that is equipped to report contextual content without introducing additional frames or values into the basic communications protocol. A solution to these and other interrelated problems represents an unmet need in the art and is an object of this invention.

SUMMARY

Disclosed are devices, systems and network architectures for beacon-mediated notifications where the beacon transmission is overloaded by writing sensor data, including input stimuli generally, into one or more values of a low bandwidth formatted transmission. In a first embodiment, the invention is a notification system having at least one beacon configured with a low energy radio signal emitter module enabled to transmit a Bluetooth low energy radio signal and at least one receiver for receiving that signal, further in which the beacon includes a sensor module enabled to measure a contextual parameter or datum (termed here generally "contextual content") and output a digitized report containing that contextual content, such that the emitter module is configured to encode the digitized measurement in the transmission. The transmission conforms to a beacon communications protocol having frames defining a UUID value, a major value, and a minor value. At least one frame of the transmission is overloaded by a substitution of the contextual content for at least a part of at least one such value while not violating the communication protocol. The receiver includes an antenna for receiving the transmission, non-volatile memory containing a program with instructions in digital form for an application, and a processor configured to execute the instructions; where the application is designed to receive the transmission, to extract the contextual content from the frame or frames, and to trigger a notification to the owner of the receiver, such that the notification contents are contextually relevant to the location and setup information associated with the UUID value, the major value, or the minor value, in light of the contextual data output by the sensor and transmitted in frame. The repeating beacon signal defines a bitstream which in turn defines three frames, at least one frame having at least one bit is reserved for a sensor output. Surprisingly, dynamic measurement and transmission of sensor data to mobile devices is accomplished in this way with minimal bandwidth to a wide variety of receivers, including iOS and Android devices, specialized hubs and computing machines with wireless receivers more generally. Users may also share contextual data in this way.

The sensor data may include temperature, light intensity, smoke, voltage, sound, motion, displacement, acceleration, humidity, pressure, radiation, button-press event, compass direction, or to report daylight levels, windspeed, traffic levels, noise levels, NOX levels, and unusual noises such as gunshots or sirens, or self-reporting, such as reporting a low battery level, or other stimulus or sensor data without limitation thereto.

In addition, bit overloading may be used as a security feature, such that only compatible applications enabled to mask, sequence, or decode the bitstring are able to access notifications and higher levels of the system.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which:

FIGS. 8A, 8B and 8C are screen views of a graphical user interface used to operate and set up notifications for an exemplary beacon having sensor monitoring and tracking capability.

Figure 1A:
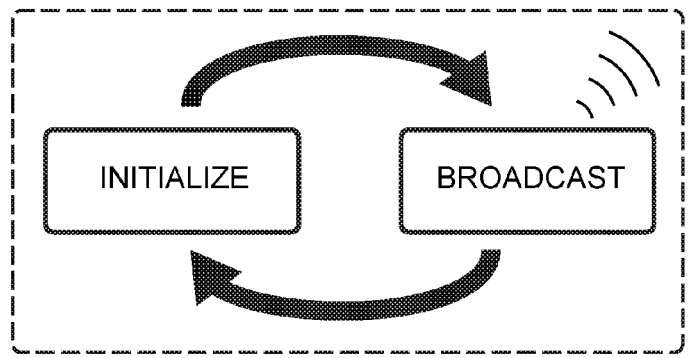
FIG. 1A is a block diagram views of a beacon transmission event of the prior art.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

GLOSSARY

The following definitions supplement those set forth elsewhere in this specification. Certain meanings are defined here as intended by the inventors, i.e., they are intrinsic meanings. As one skilled in the art will appreciate, different persons may refer to the same feature, step or component by different names. Components, steps or features that differ in name but not in structure, function or action are considered equivalent and not distinguishable, and may be substituted herein without departure from the invention(s) as claimed. Unless otherwise defined, all technical and scientific terms used herein have the same meaning as would be commonly understood by one of ordinary skill in the art to which this invention belongs. In case of conflict, the present specification and definitions contained herein will control.

"Contextual content"—(also termed here, "environmental input", "contextual data" or "stimulus input") refers to any bit or bitstring of data corresponding to a sensor output received by a processor for transmission, and may include data related to temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus or sensor data, without limitation to these example contextual contents. In some instances a sensor is a switch having two positions such that the datum is an indication that the switch has been tripped, such as a button switch when pressed, a photocell that has been triggered by light, or a motion sensor that has been tripped by motion, and so forth. More sophisticated sensors may also be used, such as radiation detectors, chemical detectors, biological detectors, and sound discriminators, where the output may be relatively simple to represent digitally, but the sensor module itself is a complex analytical device. Sensors associated with beacons may be used in clusters, such as to report temperature, humidity, windspeed and barometric pressure, or to report daylight levels, traffic levels, noise levels, NOX levels, and unusual noises such as gunshots or sirens. These may be termed "sensor net" applications and may be global or local. Self-reporting, such as reporting a low battery level, is also included in the scope of contextual data. Preferred sensors are miniaturized so that they may be co-housed with the radio controller and emitter module. Generally the sensor module will include a controller for conditioning and digitizing the output and may include a microcontroller function for execution of basic program steps, where the instruction set is stored on-board in non-volatile memory or as firmware, or is executed when received by a radio receiver associated therewith. Contextual data may also be used to enable security features of the beacon communications systems.

"Computer" means a virtual or physical computing machine that accepts information in digital or electronic form and manipulates it for a specific result based on a sequence of instructions. "Computing machine" is used in a broad sense, and may include logic circuitry having a processor, programmable non-volatile memory or firmware, random access memory, and generally one or more ports to I/O devices such as a graphical user interface, a pointer, a keypad, a sensor, imaging circuitry, a radio or wired communications link, and so forth. One or more processors may be integrated into the display, sensor and communications modules of an apparatus of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computers are frequently formed into networks, and networks of computers may be referred to here by the term "computing machine." In one instance, informal internet networks known in the art as "cloud computing" may be functionally equivalent computing machines, for example.

A "server" refers to a software engine or a computing machine on which that software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example. Processors may operated with iOS and Android operating systems, or with more basic programming architectures such as provided by the Raspberry Pi OS (Raspberry Foundation, Cambridge UK), Python or Linux and so forth.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

FIG. 1A is a block diagram view of a beacon transmission event of the prior art. Beacon transmission is an iterative process, where initiation and emission are cyclical. The beacon typically does not have a receiver but is configured using a wired link and then deployed as a stand-alone transmitter. The beacon continues to transmit even when detached from the wired link and is typically battery powered. One kind of beacon is represented by iBeacon (Apple, Cupertino Calif.). Other beacons are known in the art.

Figure 1B:
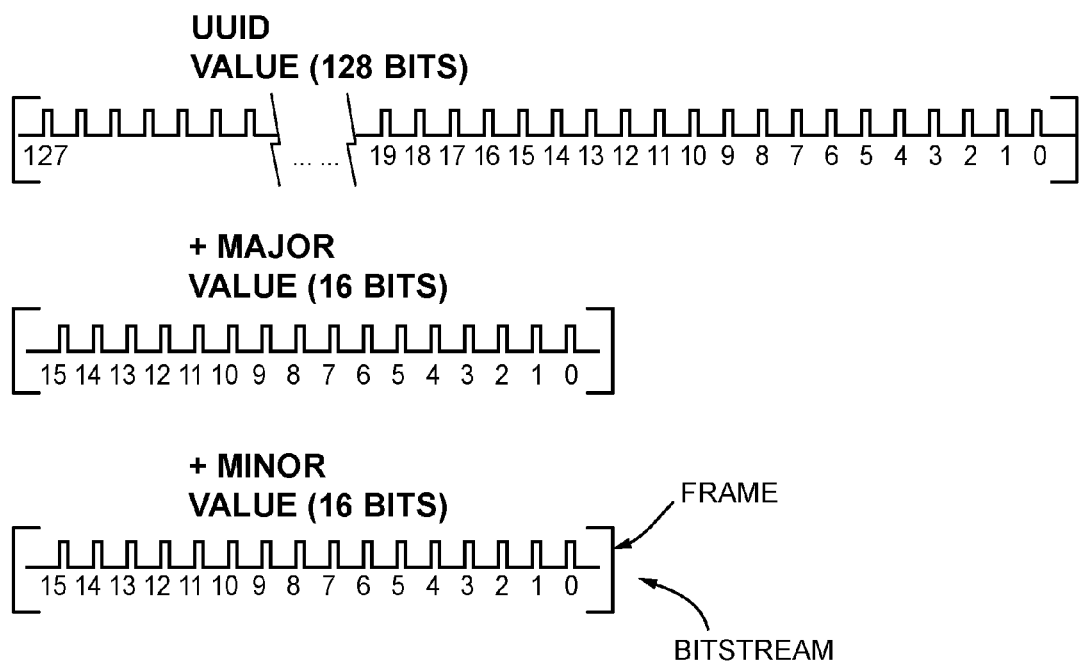
FIG. 1B is a schematic view of a signal structure of the prior art.

FIG. 1B is a schematic view of a signal structure of the prior art. Signals are radio waves that can be processed into bitstrings and organized into frames or packets. As used here, the bitstrings contain at least three frames, the first a 128-bit value commonly known as a UUID (universally unique identifier), a 16-bit string termed the "major value", and a second 16-bit string termed the "minor value". Frames are indicated by a pair of brackets in these figures; individual bits by a square wave. Bit numbers are shown on the square wave plots, but may correspond to zeros or ones when digitally stored. Transmissions having this structure are generally preceded by an opening prefix, and comply with wireless protocols known in the art, which are herein incorporated by reference if needed, from IEEE Std. 802.11 (1999 Edition) entitled "Part 11: Wireless LAN Medium Access Control (MAC) and Physical Layer (PHY) Specifications", 96 pages and Specification of the Bluetooth System—Wireless connections made easy—Master Table of Contents & Compliance, Requirements—Covered Core Package version: 1.2 issued Nov. 5, 2003, 1200 pages. Either Little Endian or Big Endian protocols may be used, but the beacon specification sets a Little Endian standard.

Figure 2A:
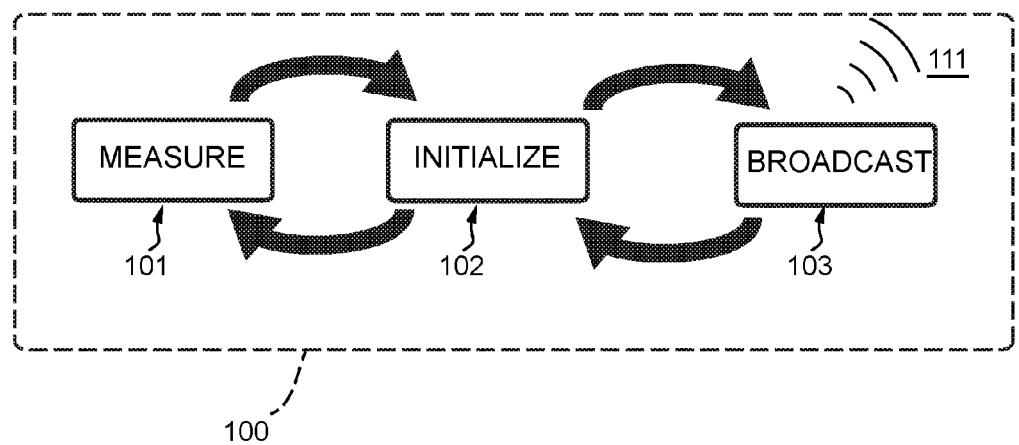
FIG. 2A is a block diagram of a beacon transmission event having a sensor component.

FIG. 2A is a block diagram of a beacon 100 emitting a radio transmission 111 having a sensor component. Represented are rudimentary functional blocks (101, 102, 103) corresponding to sensor measurement, initialization, and broadcast. These steps may be repeated continuously, may synchronized, or may be performed discontinuously at a frequency dictated by the needs of the user and context. Current generations of beacons may broadcast at 10 ms intervals, 30 second intervals, or any intermediate time interval, for example and operate as low computing resource devices. However, addition of a sensor module and addition of basic processor functions and programmability are disclosed here that permit the broadcast to be "overloaded" with the sensor data without disrupting the underlying communications protocol format.

Measure is an operation having the quality of digitizing a contextual condition or event and can be as simple as a step for determining whether a button is pressed or not, or an operation such as collecting and digitizing a photocell output, which may include steps for amplifying and filtering as needed, or more complex operations such as determining a temperature change over an interval of time. The measurement data is then incorporated into a bitstring through an initialization operation. The broadcast is sent via a radio module as known in the art, and the process is iterated.

FIGS. 2B, 2C, 2D and 2E are exemplary schematic views of signal structures having an overload consisting of dynamic environmental sensor output. The radio signal (200, 210, 220, 230) of each figure consists of three parts that would be concatenated together in an actual signal stream. In each of the figures, three frames of the bitstream are presented schematically as chains of square waves, each square wave corresponding to a bit of a transmission. Bits are numbered and each frame is titled for reference. The UUID VALUE, MAJOR VALUE, and MINOR VALUE are analogous to a standard beacon deployment and could correspond to an identifier unique to the device (as set by the developer or manufacturer), a major value corresponding to a first location value such as a store at location X, and a minor value corresponding to a second location, such as the housewares department in the store at location X. By programming a global minor value, the minor value may for example refer to all housewares departments in all stores, simplifying global programming to be implemented across a chain of stores, for example. However, some bits may be dynamic, and may change according to a measurement. The input from the measurement is not static and will change according to the context, where context is the beacon environment (including internal conditions) and the relationship with the receiver device. The broadcast frames may thus contain embedded content that is dynamic. When the beacon signal is recognized by a compatible receiver, various techniques may be used to decode the dynamic content. Receivers having the required program instructions are enabled to read the dynamic content. The receiver is then generally in communications with a cloud-based system and will share the dynamic content so as to generate a modified notification or an incentive for the benefit of the owner of the receiver, for example. The operator of the beacon may also benefit, and the operator of the beacon and the operator of the receiver may be the same. Sharing is also permitted through policies established by the owner of the receiver. Because the content is dynamic, different alerts or actions may be initiated according to the content without the need to reprogram the cloud service, for example. Also the dynamic content can result in activation of individualized policies in the receiver, and may have a role in securing transmissions.

Figure 2B:
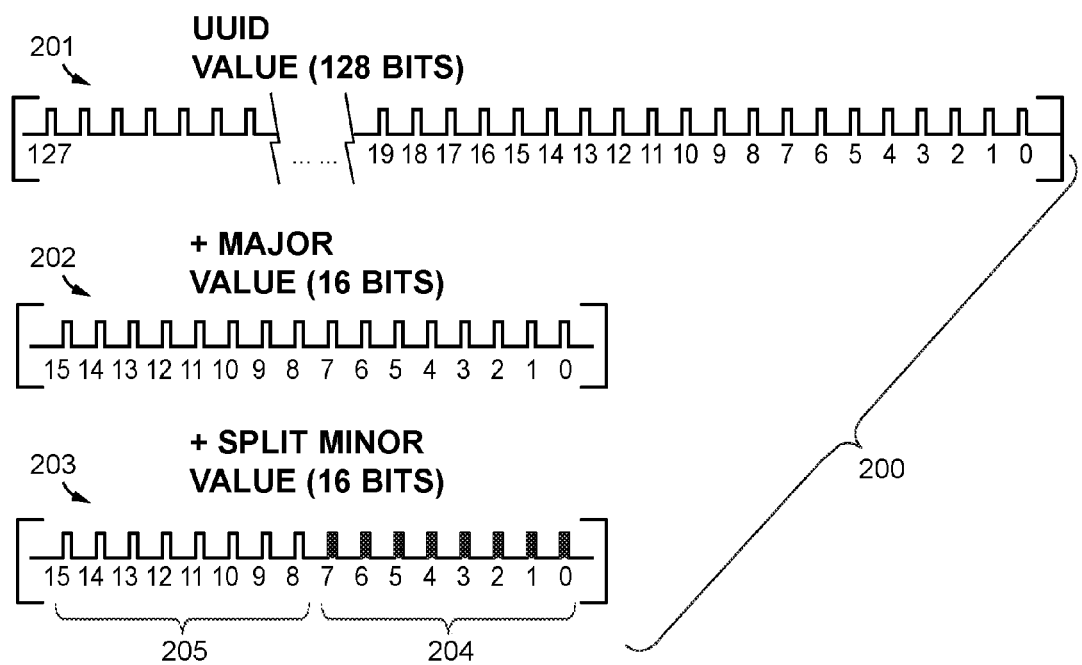
FIGS. 2B, 2C, 2D and 2E are exemplary schematic views of signal structures having an overload consisting of dynamic environmental sensor output.

In FIG. 2B, an overloaded beacon transmission 200 is presented, but the minor value has been overloaded. The bitstream includes sensor data encoded in what is termed a "SPLIT MINOR VALUE". The UUID VALUE (201), MAJOR VALUE (202), and SPLIT MINOR VALUE (203) are readily processed in a standard program application but the minor value is now "split" and no longer corresponds to a 16-bit store sub-location. Of the minor value bits, eight bits 205 are retained for conventional functions, and eight of bits 204 are reserved for dynamic contextual data output from a sensor module associated with the beacon. Because sensor data is variable, the frame value may change at the refresh rate of the beacon (as suggested in FIG. 2A, where new sensor output is continuously broadcast). Using an application written specially for the modified frame structure, a smart receiver can readily decode any contextual data in reserved bits (204, dynamic bits). The receiver may also isolate a conventional frame value (205, static 8 bits) from the signal. The signal may also include a time stamp and a geotag, so that a table of contextual data values as a function of time and location is readily constructed. This is useful in developing trends in context and/or environmental parameters and may be incorporated into a relational database so that other variables may be queried in the context of an environmental variable, for example. In a simple application, the temperature in all the stores or all the store departments may be called up from the temperature log. In more complex applications tailored for home use, an alert may be generated to a user's smartphone if any motion is detected by a beacon during hours when no one is home. Sensor output encoded in frame in this way for transmission may include temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus or sensor data without limitation thereto, and may include any data that is compactly digitized for inclusion in a frame of the communications protocol without violating the protocol. In some embodiments, sensor data may also include a combined multi-axis motion sensor and temperature sensor integrated into the BTLE radio emission module 302, which includes an accelerometer, a gyroscope, and a magnetometer for each axis. Other sensor data without limitation may be encoded for transmission to a host device, server, or network by overloading frame values of a communications protocol.

Figure 2C:
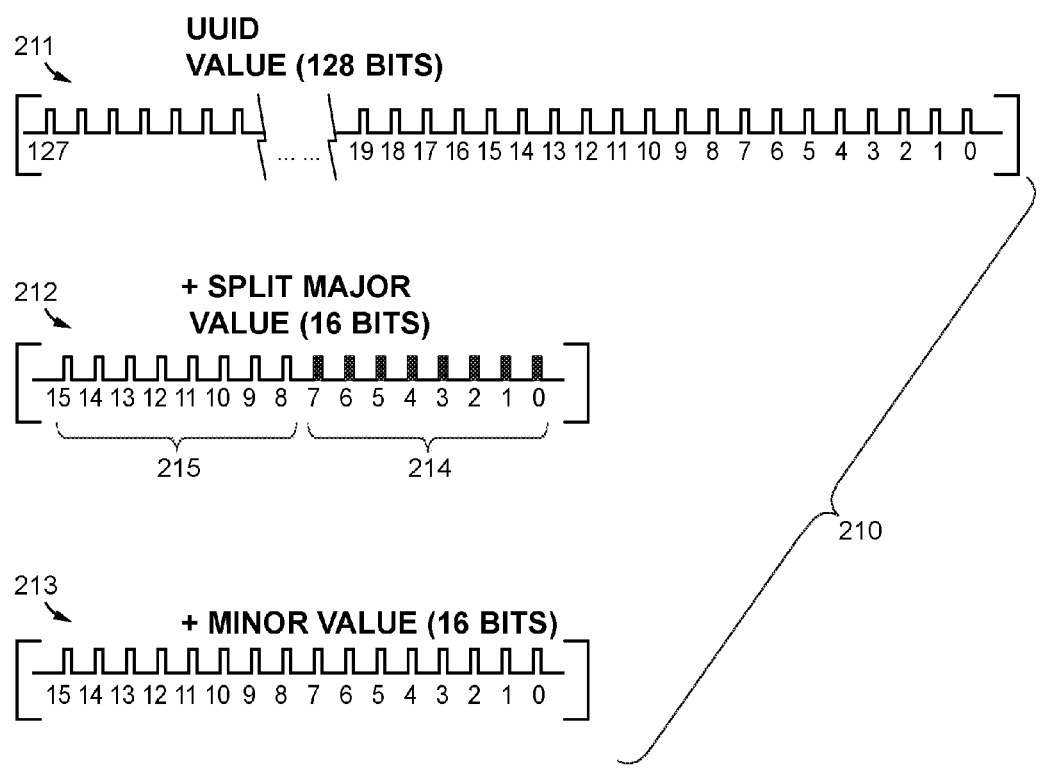

In FIG. 2C, for overloaded transmission bitstring 210, the major value has been overloaded. The bitstream includes sensor data encoded in what is termed a "SPLIT MAJOR VALUE". The UUID VALUE (211), SPLIT MAJOR VALUE (212), and MINOR VALUE (213) are readily processed in a standard program application but the major value is now "split" and no longer corresponds to a 16-bit store sub-location. Of the major value bits, eight bits are retained for conventional functions, and eight bits are reserved 214 for dynamic contextual data output from a sensor module associated with the beacon. Because the contextual data is variable, the frame value may change at the refresh rate of the beacon. Using an application written for the modified frame structure, a smart receiver can readily isolate the conventional frame value (214, static 8 bits) from the sensor data (215, dynamic 8 bits) and write the reserved bits 214 to a register in memory. The signal may also include a time stamp and a geotag, so that a table of contextual values as a function of time and location is readily constructed.

Figure 2D:
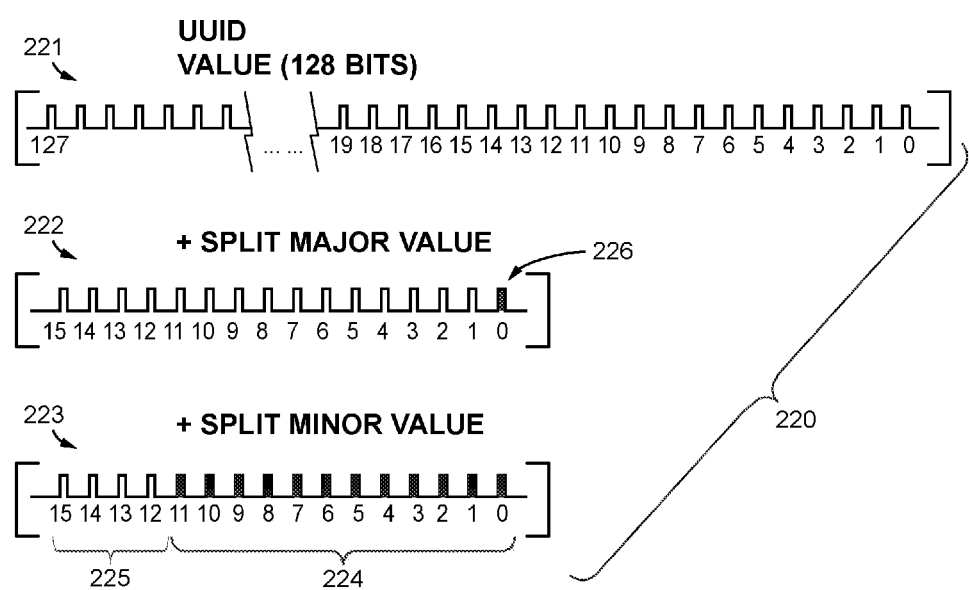

In FIG. 2D, for overloaded transmission bitstring 220, both the major value frame and the minor value frame are split between static conventional data and dynamic sensor data. The split minor value allows up to twelve reserved bits 224 for a digitized output from one or more sensors and four reserved bits 225 for owner-specified information such as department or subunit. The split major value reserves one bit 226 for a zero or one output from a special sensor such as a switch. The reserved bits 224 are read by the processor, are written to memory, or may be relayed to a database resource for cloud computing. Reserved bits may be selected from least significant bits or a most significant bits.

Figure 2E:
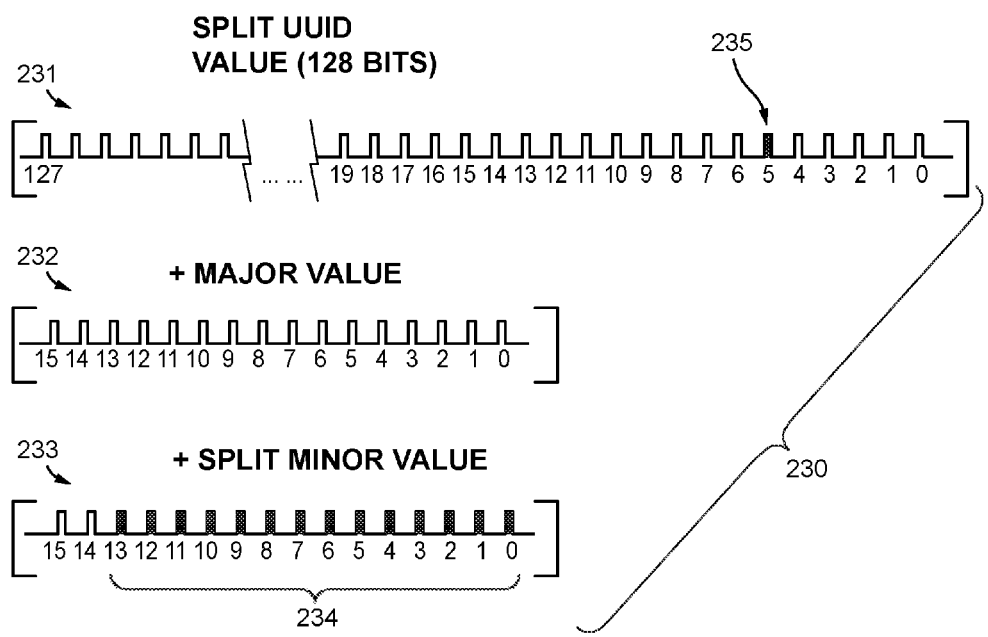

In FIG. 2E, for overloaded transmission bitstring 230, the UUID value 231 is split at 235, and 10 bits of sensor data 234 are reserved in the split minor value. Using an application written for the modified frame structure, a smart receiver can readily isolate the conventional frame value (static leftwise 2 bits of minor value frame 233) from the sensor data (dynamic rightwise 14 bits of minor value frame) and write the reserved bits 234 to a register in memory. The signal may also include a time stamp and a geotag, so that a table of contextual values as a function of time and location is readily constructed.

Reserved bit 235 presents a number of possibilities. Compatible applications that receive the broadcast may perform different functions or perform a related function differently after decoding the "magic bit". Thus in one instance it becomes possible to pre-program a device to perform two (or four, or more) functions according to a very small "trigger". The UUID will be read under a first environmental context (daylight, for example) as appearing in a lookup table of a first relational database or a first website; but under a second environmental context (darkness), it will direct the receiver to a second relational database or second website, and may result in entirely different outcomes dependent on the environmental context represented in the sensor data. Alternatively, both UUID variants may appear in a single look-up table, but be associated with different actions or outcomes. Alternatives may include push notifications tailored to particular contextual conditions or to trigger a shift in security features and permissions for example. In some instances the receiving device will mask or extract the bits of interest. The magic bit 235 may actuate routines for masking or extracting other bits according to security protocols. A compatible host may sequence the bits that are overloaded, as may find use in encoding and security applications. Data that cannot be interpreted by devices without the required permissions or policies can be broadcast in the open using the bit overloading to shift and encode algorithms of the invention. In other instances, masking can lead to signal reads in which one or more bits or blocks of bit are read as "null bits", so that the signal may have two or more possible reads that lead to unique outcomes. Of particular interest are combinations in which a contextual datum is combined with tags for location, timestamp, or programmed object, so that the user may construct a family of applications of personal interest without adverse exposure to spoofing.

In the personal sphere, numerous applications are possible. Sensors may report proximity to friends, an approaching bus, a noise at home when the family is away, a power failure, a low battery, any one of which may lead to a unique notification that is triggered by the sensor data encoded in the frame values or in combination with timestamp, location, or other data stored by the receiving device.

Figure 3:
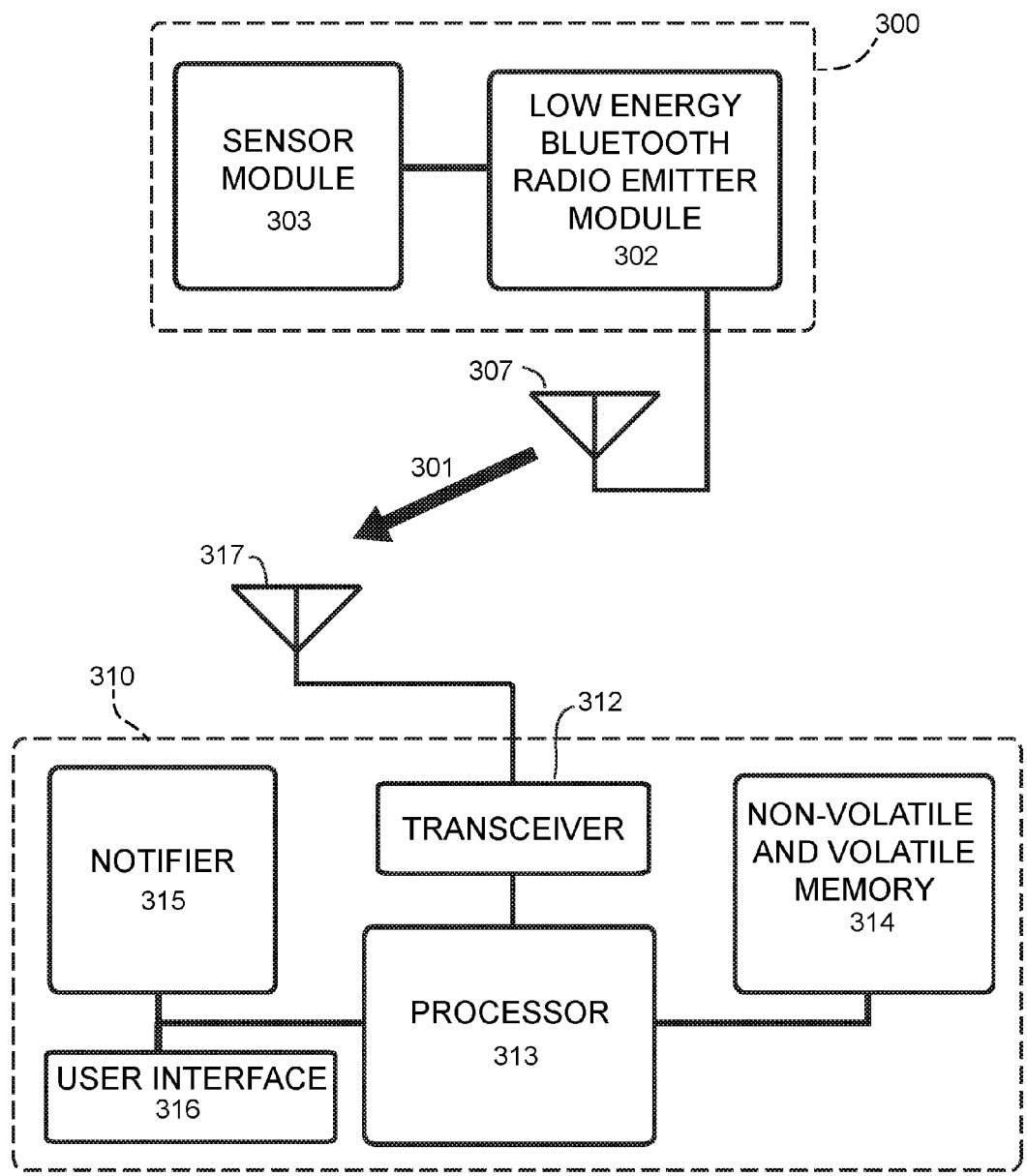
FIG. 3 is a block diagram of functional components of a beacon and a receiver in radio communication, the receiver having a processor and application for receiving a radio signal overloaded with sensor data.

FIG. 3 is a block diagram of functional components of a beacon 300 and a receiver 310 in radio communication, the receiver having a processor and application for receiving a radio signal from the beacon. The beacon signal 301 emitted by radio emitter module 302 is overloaded with sensor data from sensor module 303 as described for FIGS. 2B-2E. The overloading function may be performed by a software encoder programmed within the BTLE emitter module, which functions as a microcontroller with on-board non-volatile and volatile memory. The signal broadcast by the radio may be configured to contain an identifier value (UUID), a major value, and a minor value, where in part, at least one of the values is overloaded with at least one sensor output from sensor module 303 in digitized form insertedly encoded in the standard frames of the comm protocol as describe above. Thus the encoder function may be integrated into the BTLE radio emitter and is implemented using software or firmware or a combination of both. The beacons may be battery powered or otherwise powered as known in the art.

At the receiving end, generally the sensor data is extracted from the bitstring using a software application developed to decode the bits conveying sensor data for the processor 313 or memory 314. The receiver 310 may be a "hub" or host device such as a smartphone and may be equipped with a portal to the Internet or a network, either wired or wireless (not shown). Processor 313 is configured to read and execute an application or applications from non-volatile memory 314 and to receive and process the radio signal 301 as received and amplified by transceiver 312. Depending on the contents of the radio signal, particularly with respect to any contextual data encoded in the signal, the processor will issue an instruction to a notifier module 315 and will push an alert or a notification onto a user interface 316. The device may also include a policy controller that controls traffic and displays according to permissions set by the user. Each device is equipped with a compatible antenna (307, 317) and may be battery powered or otherwise powered as known in the art.

The sensor module may include one or more sensors. Sensor output encoded in frame for transmission may include temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus or sensor data without limitation thereto. In some embodiments, sensor data may also include a combined multi-axis motion sensor and temperature sensor integrated into the BTLE radio emission module 302, which includes an accelerometer, a gyroscope, and a magnetometer for each axis. Other sensor data without limitation may be encoded for transmission to a host device, server, or network by overloading frame values of a communications protocol as described in FIGS. 2B-2E. Sensor output may serve as a trigger for actuating programmed responses in a host device or in a remote device in direct or indirect communication with a network. Sensor power is commonly derived from the host, but in selected applications, a separate power supply may be provided.

Figure 4:
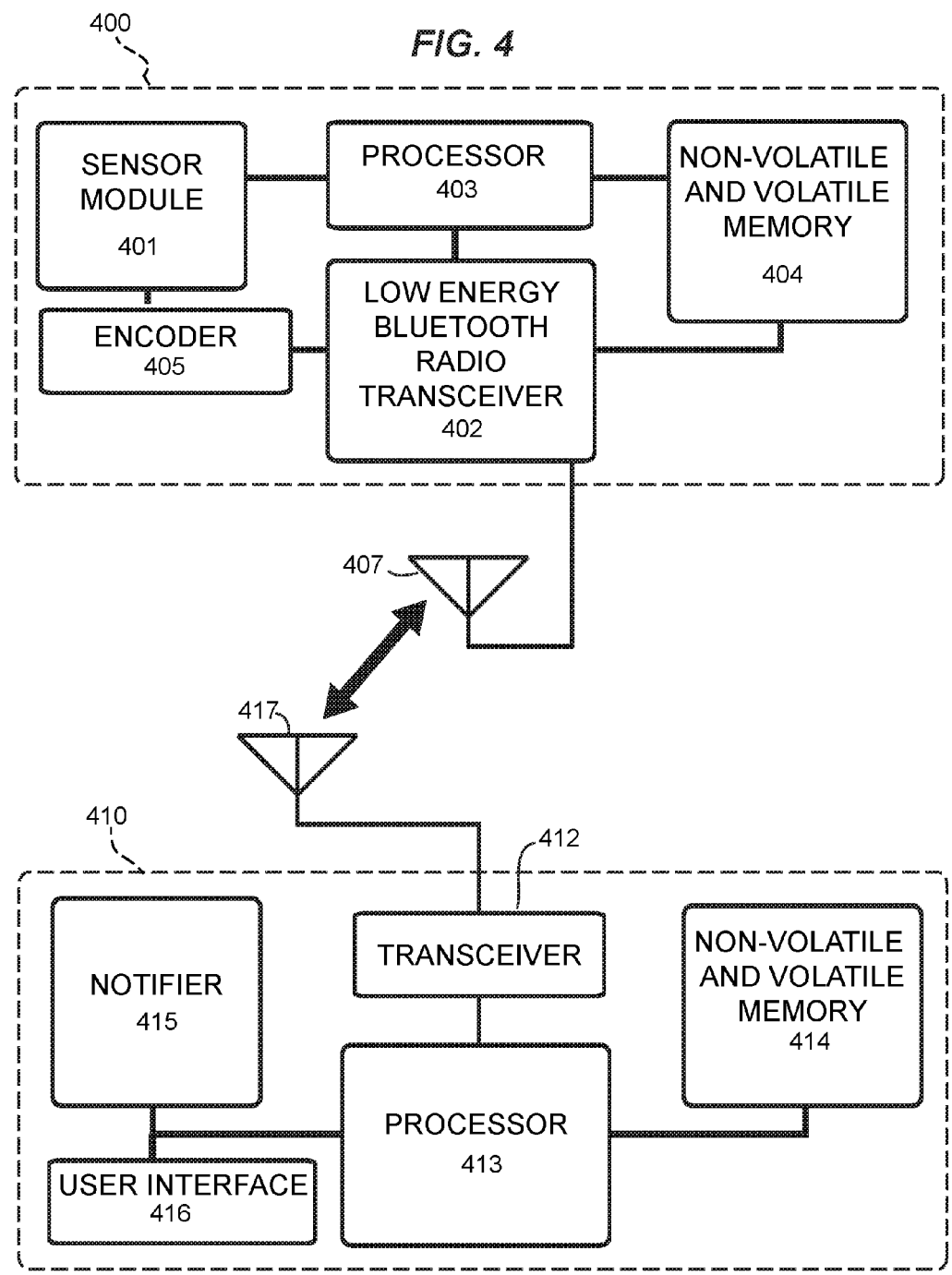
FIG. 4 is a block diagram of functional components of a beacon and a receiver, the beacon and the receiver both having a processing capacity and a non-volatile memory capacity for storing an instruction set.

FIG. 4 is a block diagram of functional components of a beacon 400 with sensor module 401 and a companion receiver unit 410, the beacon and the receiver both having a processing capacity and a non-volatile memory capacity for storing an instruction set. In this embodiment, both the beacon and the receiver include a radio (402, 412) capable of receiving and transmitting radio signals. The transceiver module 402 of the beacon is a Bluetooth low energy (BTLE) radio and is adapted to convert beacon identifier and sensor data to current and then to electromagnetic waves, or in reverse, to convert the radio waves to digital data (as applicable). One or more receive and/or transmit amplifiers may optionally be used to amplify signals received or sent, as is well known in the art. A portable power source (such as a battery) is typically provided to supply power to the various components of the beacon. Each device includes a compatible antenna (407, 417).

Communications must follow a common format. In some variants, the host device or base station is configured to transmit relevant configuration information to the beacon in order to tell that beacon specifically what configuration of command language is needed. This can be implicit (e.g., the host device receives the prefix and UUID values received from the beacon and enters a database or other source of information to determine a proper command protocol for the various subsystems of that particular beacon, or explicit (e.g., where the beacon explicitly instructs the host device what protocol to use, or even provides a communication properly formatted so that the host device need only run a designated application in order to invoke the desired operational policies. In brief, the emitter module 402 is designed to emit radio signals according to the Bluetooth low energy interface standard and the iBeacon communication protocol standard. In one embodiment, the beacon is adapted to communicate with a receiver 410 in the form of a host device or base station that in turn may relay data received from the beacon to a broader network, such as through a cellular telephone network or DSL router, and thus serves as a mobile access point for access to the Internet or a wider network.

The exemplary beacon of FIG. 4 further comprises a microcontroller or microprocessor 403 with supporting circuitry that is adapted to perform basic processing operations according to instructions in non-volatile memory 404 or supplied as firmware. Memory comprises one or more storage devices capable of storing bits of data. Memory may therefore comprise any combination of volatile memory of non-volatile memory in accordance with the scope of the present invention (for example, DRAM, SRAM, flash memory, EAROM, EPROM, EEPROM, and/or myriad types of other memory modules). In this embodiment, memory in the beacon may be used to store sensor data for later recall or transmission. Generally a clock is also provided so that data can be timestamped for storage. Optionally data may also be geotagged. The microprocessor 413 of the host device 410 is adapted execute one or more programs stored in memory 414 which inter alia may include a subroutine for transmitting GPS coordinates from a GPS receiver to a cloud service over a cellular or other wireless interface. This data and other data may be associated with sensor data in a transmission or stored in local memory for later retrieval in response to a structured query.

Thus these beacons 400 provide a richer computing resource environment when compared to the more limited resource beacons 300 illustrated in FIG. 3.

The microprocessor 413 is further adapted to execute one or more programs which, upon detecting a specific control signal, modify the functionality of the beacon 400 (or vice versa) according to the type of signal detected, or alternatively, by the contents of the signal provided (e.g., sensor data and identifiers embedded within the beacon signal as described elsewhere herein). In one embodiment, once the host device functionality has been changed according to a governing policy or multiple policies, actions such as push notifications (generated by notifier module 415) may be performed without direct involvement by the owner of the host device. The notifier module has access to a user interface 416 on device 410 and is configured to display or announce alerts in response to triggers or signals contained in the data received from the beacon, either directly or indirectly (as via a server in receipt of the beacon sensor data and having programming capacity to craft notifications directed to particular users based on sensor data, including input stimuli generally, and other data in one or more relational databases, for example). These features generally require some degree of programming that may be resident in the host device and executed by the host processor 413 or accessed through computing resources in the cloud.

The sensor module may include one or more sensors. Sensor output encoded in frame for transmission may include temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus or sensor data without limitation thereto. In some embodiments, sensor data may also include a combined multi-axis motion sensor and temperature sensor integrated into the BTLE radio emission module 302, which includes an accelerometer, a gyroscope, and a magnetometer for each axis. Other sensor data without limitation may be encoded for transmission to a host device, server, or network by overloading frame values of a communications protocol as described in FIGS. 2B-2E. Sensor output may serve as a trigger for actuating programmed responses in a host device or in a remote device in direct or indirect communication with a network.

Generally as part of processor functions, a policy controller comprises logic adapted control signals received from connected devices and is implemented as one or more software modules resident in one or more memory sources and executed by the processor. In other devices, the policy controller may take the form of a network controller. The policy controller comprises logic adapted to store information pertaining to designated policies. For example, a given policy may require muted ringers and reduced lighting when a wireless device is determined to be in a certain zone, as triggered by a sensor data input from a beacon.

Also, in many embodiments, the policy controller facilitates the transfer of one or more control signals or commands to a network of devices. In one variant, the control signal comprises a command disposed within the well-known "beacon" frame format of the 802.11 WiFi Interface. This beacon frame format may comprise a plurality of vendor-specific information or data elements which may be used to convey policy information to the wireless device. It will be recognized, however, that other approaches for communicating with the mobile/wireless devices may be used consistent with the invention, including for example use of Bluetooth communications signals, or cellular forward/reverse traffic or control channels, etc. as applicable.

In order to conserve bandwidth and to ensure unambiguous transmission of sensor data from the beacons, framing of signals and overloading of the sensor data is performed as described in FIGS. 2B-2E. The overloading function may be performed by an encoder 405 associated with the BTLE emitter module or may be performed by software executed in the emitter module or by a processor 403 associated with the emitter module 402. The signal broadcast by the radio may be configured to contain an identifier value (UUID), a major value, and a minor value, where in part, at least one of the values is overloaded with at least one sensor output in digitized form insertedly encoded in the standard frames of the comm protocol as describe above. Thus the encoder function may be a stand-alone circuit operating to configure the radio signal or may be integrated into either the processor or the BTLE radio emitter if desired and may be implemented using software or firmware or a combination of both. At the receiving end, generally the sensor data is extracted from the bitstring using software developed to decode, mask or unmask the bits conveying sensor data for the processor 413 or memory 414. Relational databases may also be used to store data and detect changes or trends in the data.

Figure 5:
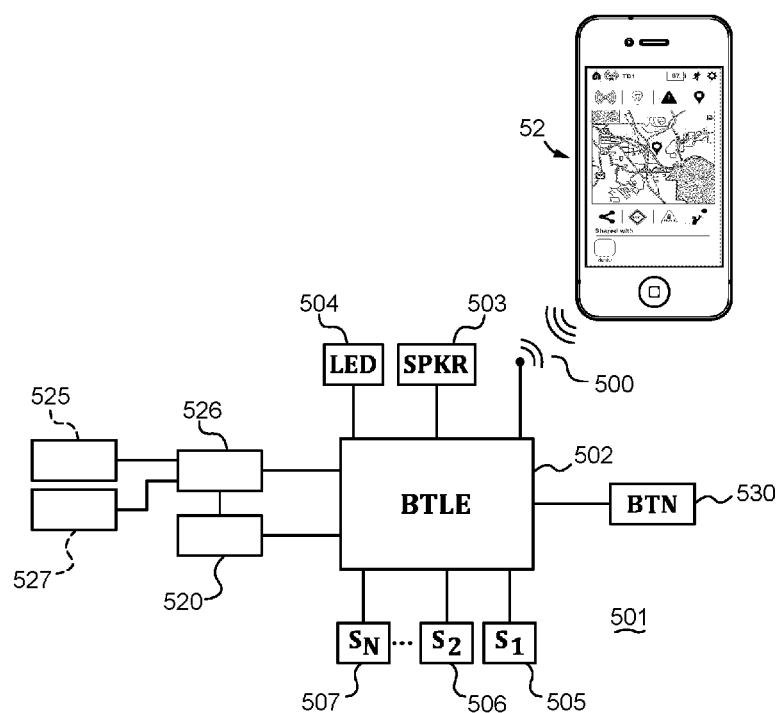
FIG. 5 is component level view of a beacon in radio communication with a smartphone.

FIG. 5 is component level view of a beacon in radio communication 500 with a smartphone 52. Component level circuitry 501 identified in this simplified block view includes a Bluetooth low energy (BTLE) core device 502. The core device includes a transceiver for sending radio signals and may also be enabled for sending control signals. Optionally, the core device may be specified for receiving data and control commands. The core device generally includes a microcontroller, read only memory (ROM), random access memory (RAM) sufficient to support rudimentary control, or may be provided with firmware sufficient for basic functions. In a further embodiment a permanent or removable memory device is added to the beacon. The memory device may be added through a slot in the outside walls or may be installed under the battery. The memory device may tabulate data collected by sensors mounted in the beacon.

The core device 502 is assigned a unique identification code (UUID) and broadcast at periodic intervals is programmed by the developer. The maximum range of the radio broadcast is about 300 feet as presently practiced. Broadcasts may be made using a ceramic antenna, a loop antenna, or a dipole antenna selected for low energy consumption.

The core device 502 controls a speaker and a light emitting diode (504). The speaker 503 and the LED 504 are configured to communicate alarms directly to a user. The LED will light up the plastic housing of the beacon from inside.

The core device 502 is connected to one or more sensors 505, 506, or any number of sensors N (507). Exemplary sensors sense environmental and physical parameters experienced by the beacon, including and not limited to temperature, light intensity, smoke, voltage, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus, sensor data, or environmental parameters, without limitation thereto. In some embodiments, a sensor 505 is a combined multi-axis motion sensor and temperature sensor. The sensor 505 has an accelerometer, a gyroscope, and a magnetometer for each axis. The information or "sensor data" output by the multi-axis motion sensor enables the receiver (i.e., a host device such as a smartphone) to monitor and track the beacon as it moves from one location to another. The motion of the beacon can be monitored continuously as long as the receiver is close enough to be in wireless contact with a sensor package on board. As an alternative the information may be stored in a memory in the beacon and accessed later.

A multifunction button 530 is operable to perform one or more functions described in more detail below. The button operates with one or more control programs resident on a host device during setup of alarms, to pair triggers, and if so enabled, to remotely control operations of the host device. Those skilled in the art will understand that a host device may be any electronic device with a processor, non-volatile memory for storing program instructions, and generally having wireless functionality, as commonly found in modern smartphones, personal digital assistants, laptops, notebook computers, tablet computers, desktop computers, or any equivalent device that can store and hold programs and data, execute programs, receive and/or transmit information and commands via wired or wireless channels of communication.

Some embodiments of the beacon of the invention are equipped with rechargeable batteries that may be recharged via a wireless or wired recharging apparatus or a solar recharging apparatus for example. Wireless chargers, also known as induction chargers, typically place one coil in a charging device or pad that is connected to an AC power source and another (receiver) coil inside the beacon and connected to a rechargeable battery 520. The internal coil also include circuitry to convert sinusoidal voltage and current to DC current and voltage. The core device 502 controls operations of the inductive charger and turns it on or off as needed to top off the battery. Battery top off controls and discharge controls are known in the art and may be implemented where warranted.

Other embodiments of the invention may have wired rechargers. These are well-known devices and may be incorporated into beacon devices of the invention by providing a suitable port (not shown) to receive power from an external power supply. However such external ports provide openings in the housing that are not desirable, and hence indirect charging means are preferred.

Still other embodiments may have solar recharging systems such as shown in FIG. 5, including solar cells 525 used in conjunction with suitable regulators 526 and rechargeable battery 527. The core device 502 is connected to the regulator 526 and battery 527. Current from the solar cell signals the presence of external light. In that way, the solar cells have a dual role by acting as light sensors. This allows flexibility in configuring notifications to the user by pairing sensor data and other contextual data to the presence or absence of light. The amount of current generated by the solar cells is indicative of the intensity of the light to which the beacon is exposed.

Other embodiments of the beacon have antennas and circuitry for harvesting RF power to charge battery 527. RF harvesters having a GMS antenna, one or more resident circuits, boosters, peak detectors, and an adder, are known in the art. The circuit contains passive components and is designed to have tuned circuits at known frequencies of cell phone towers (960 MHz) and Bluetooth devices (2.4 GHz). The boosters are Villard voltage multipliers. Reported test results show the RF harvester located within 500 m of a cell tower was capable of generating 0.16 microWatt and successfully operated a calculator and a light emitting diode. Related advances include Dickson cascade diode capacitor circuits, charge pumps, Karthaus-Fischer cascade voltage doublers and rectantennas known in the art.

Figure 6A:
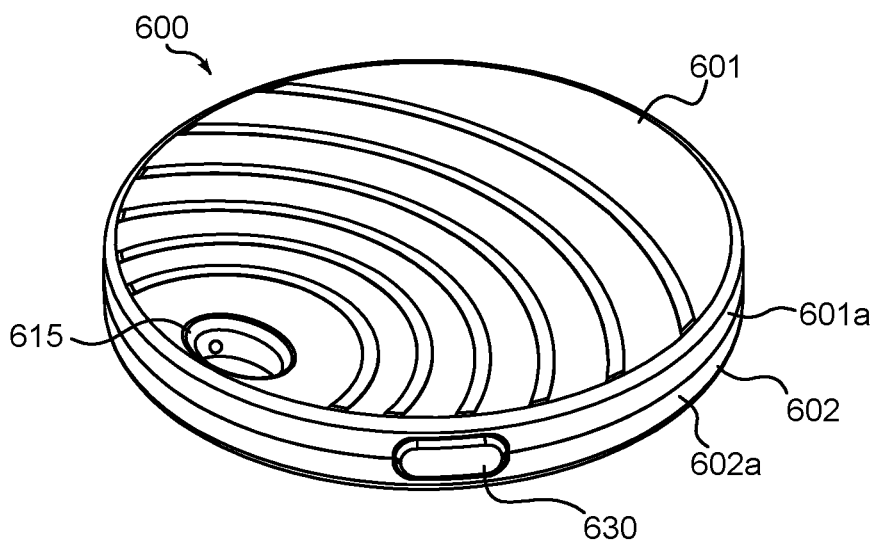
FIGS. 6A and 6B are perspective renderings of an exemplary beacon configured to broadcast sensor output overloaded in a low energy radio communications protocol.
Figure 6B:
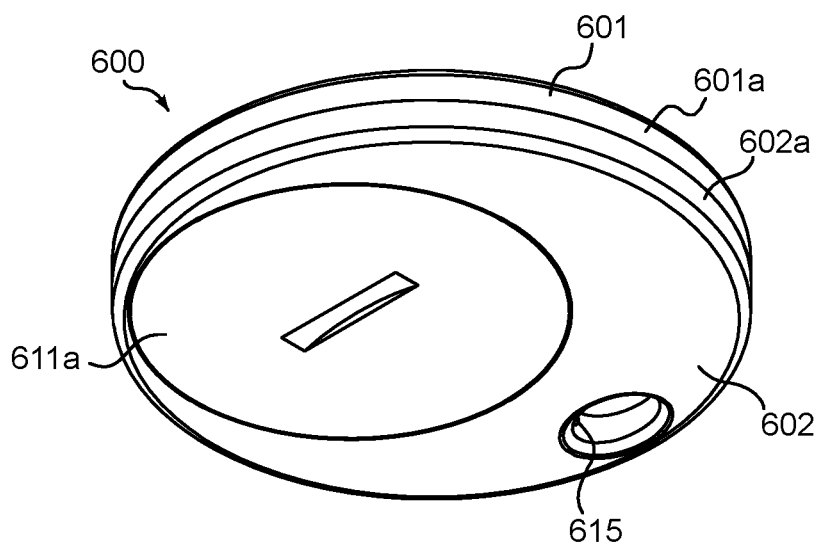

FIGS. 6A and 6B are perspective renderings of an exemplary beacon configured to broadcast sensor output overloaded in a low energy radio communications protocol. The external housing is defined by a top housing member 601 and a bottom housing member 602 with removable sealed battery cover 611a. The top and bottom housing members are assembled in a generally clamshell configuration and have reinforced sidewalls (601a, 602a) for rigidity. The top housing member includes a design of concentric ripples that is purposed as a graphical representation of the beacon for a rangefinding application operated in the host devices.

A sealed eyelet 615 for a keychain is formed in the housing. With the exception of the battery cover, the external seams of the housing are ultrasonically welded for water resistance and strength. The housing may be made of glass-filled acrylic nitrile butadiene styrene (ABS) thermoplastic, which is light in weight, can be injection molded, and is resistant to impact, heat, water, assets, alkalis, alcohols and oils. The housing is generally translucent so as to enable a photocell sensor mounted on the PCB inside the housing to respond to ambient light.

It is to be understood that the exemplary beacon shown is for illustration, and the shape of the PCB and other features such as form factor are not limited to the device as shown. Also, power supplies may be substituted according to the needs of the user. Thus a coin cell battery is only one example, and also inclusive of embodiments of the invention are power supplies selected from solar cells, EM harvesters, hard wiring to an AC or DC sources, for example.

Figure 6C:
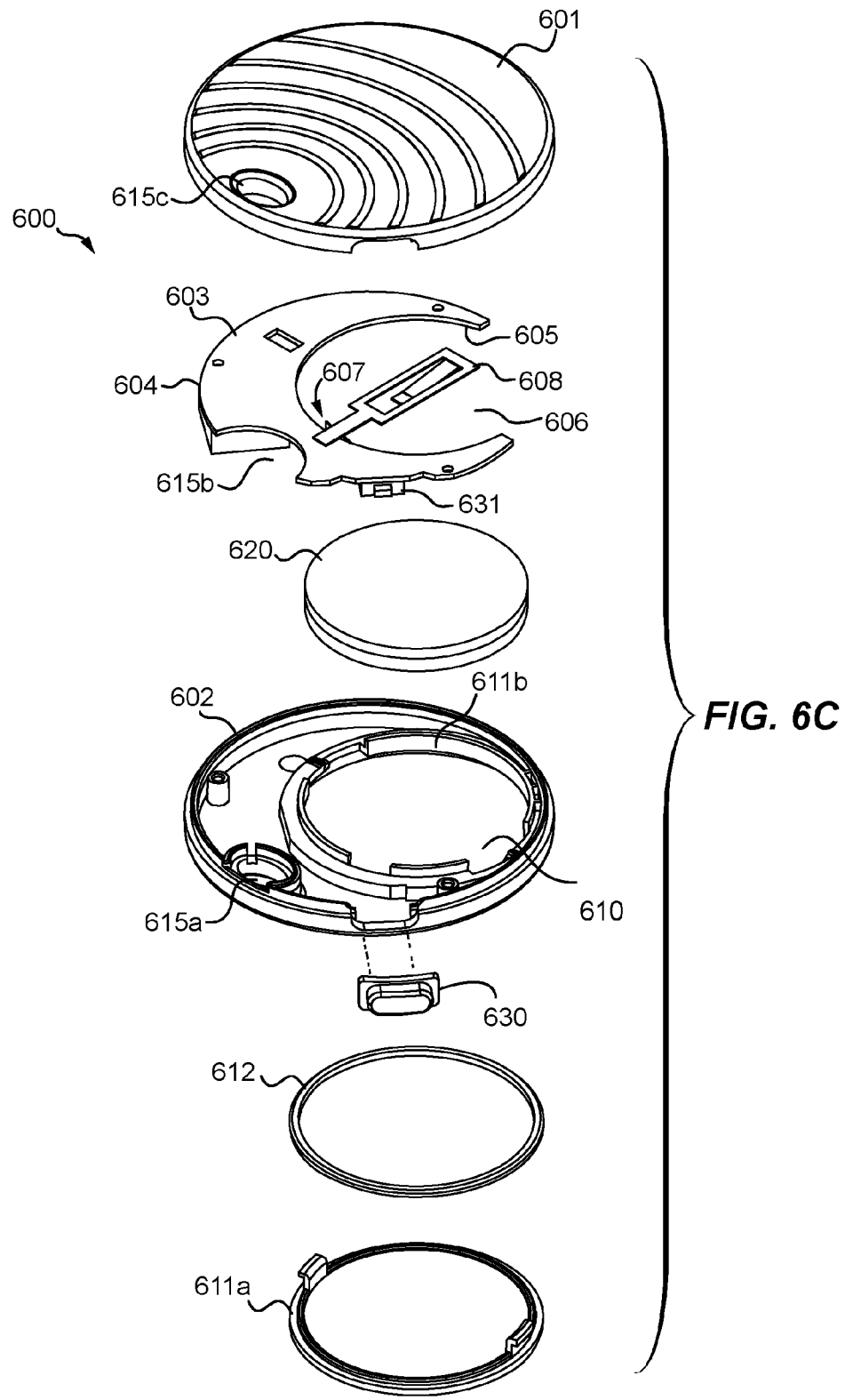
FIGS. 6C and 6D are exploded views showing the parts and sub-assemblies of an exemplary beacon.
Figure 6D:
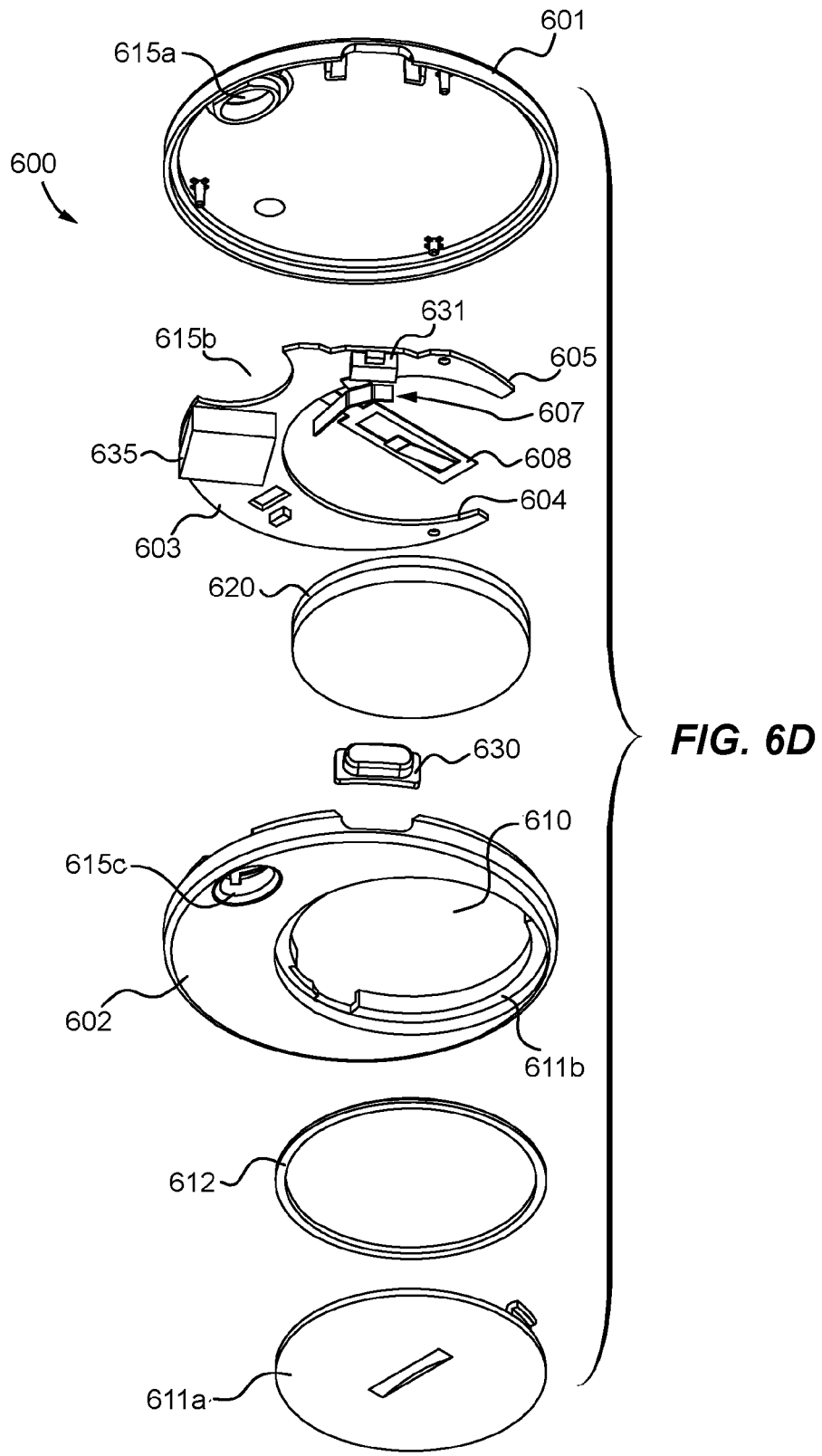

Turning to FIGS. 6C and 6D, FIG. 6C is an exploded view looking down at the parts and sub-assemblies making up a beacon. Top housing 601 and bottom housing 602 come together to form a circular shaped housing for receiving printed circuit board 603 with component circuitry and coin cell battery 620. The printed circuit board (PCB) has a crescent-shaped body with an outer edge 604 having a radius of curvature slightly smaller than the radius of curvature of the covers 601, 602; and an inner edge 605 with a smaller radius of curvature defining a center battery cavity 606. The two circular arcs of different radii thus define the crescent-shaped of the PCB. The center cavity is dimensioned to receive battery 620. The battery has one terminal on its surface and another terminal on its edge. The edge of the battery electrically engages a conductive edge connector 607 on the inner edge of the PCB. Another conductor has a spring biased body 608 that extends from the PCB toward the middle of the top surface of battery 620. The battery is held in electrical contact with PCB terminals 607 and 608 between the two covers of the housing 601 and 602. Bottom housing 602 has an opening 610 sufficient to receive the battery. The opening is sealable by battery cover 611a, which engages inside wall 611b of the center battery cavity 606, and is fitted with a gasket 612.

As fully assembled, the housing is provided with an eyelet (615a, 615b) with corresponding cutout 615c in PCB. The eyelet is used for attaching the beacon, such as attaching the beacon to a dog collar, a keychain, or to a television tuner. The beacon may also be attached to a solid surface magnetically, or maybe slipped in a pocket of a wallet or a jacket. Some embodiments of an exemplary beacon are 5 mm thin and 40 mm in diameter. Unlike other devices that use batteries, the PCB does not contribute to the thickness of the device because the battery does not rest on the PCB but is inserted into the crescent-shaped operculum in the PCB.

A multifunction button 630 inserts into a mated opening in a sidewall of the housing. The button is generally made of rubber or silicone so as to be self-sealing. The button engages switch 631, which is part of a circuit electrically coupled to a core microprocessor on the PCB.

The stack is turned in FIG. 6D so that the view is looking up at the various parts and sub-assemblies making up a beacon. Shown in this perspective is a ceramic antenna 635 and full views of electrical edge connector 607 and switch 631.

Figure 7A:
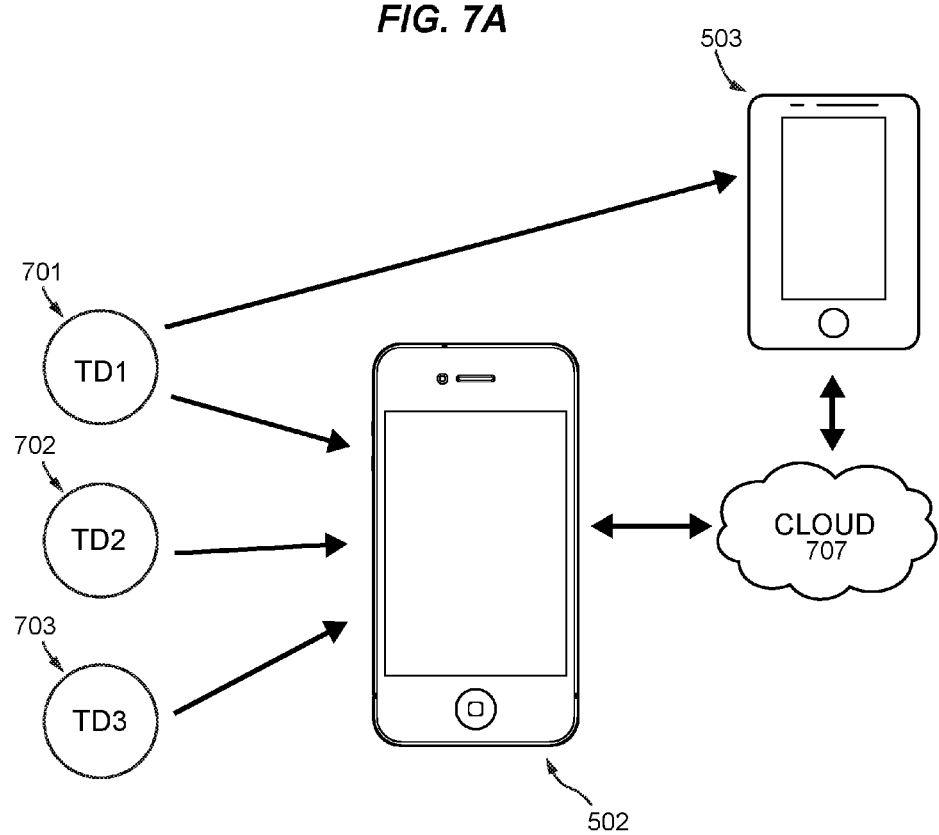
FIGS. 7A, 7B and 7C are schematics of alternate sensor networks formed from beacons of the invention.
Figure 7B:
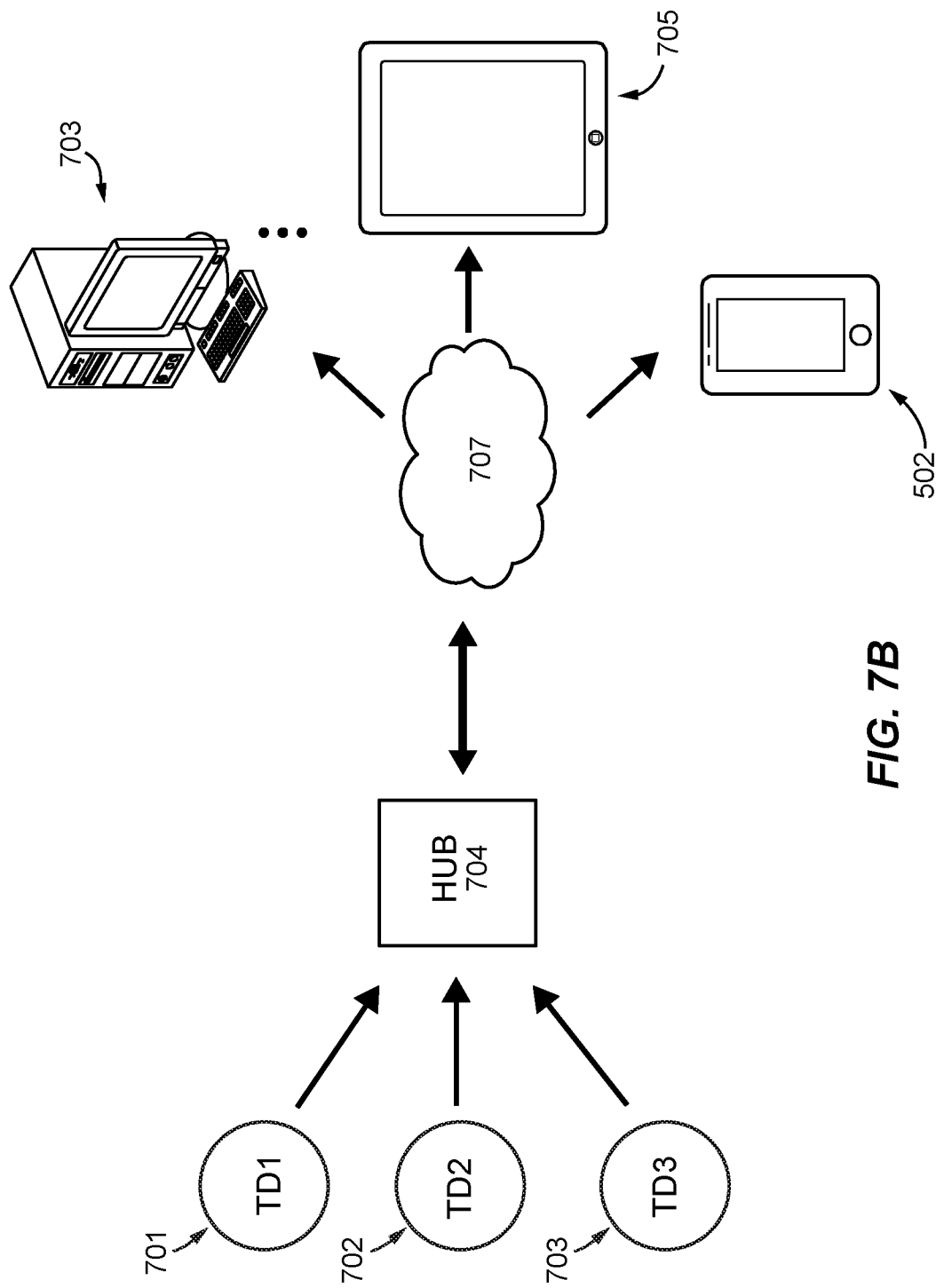
Figure 7C:
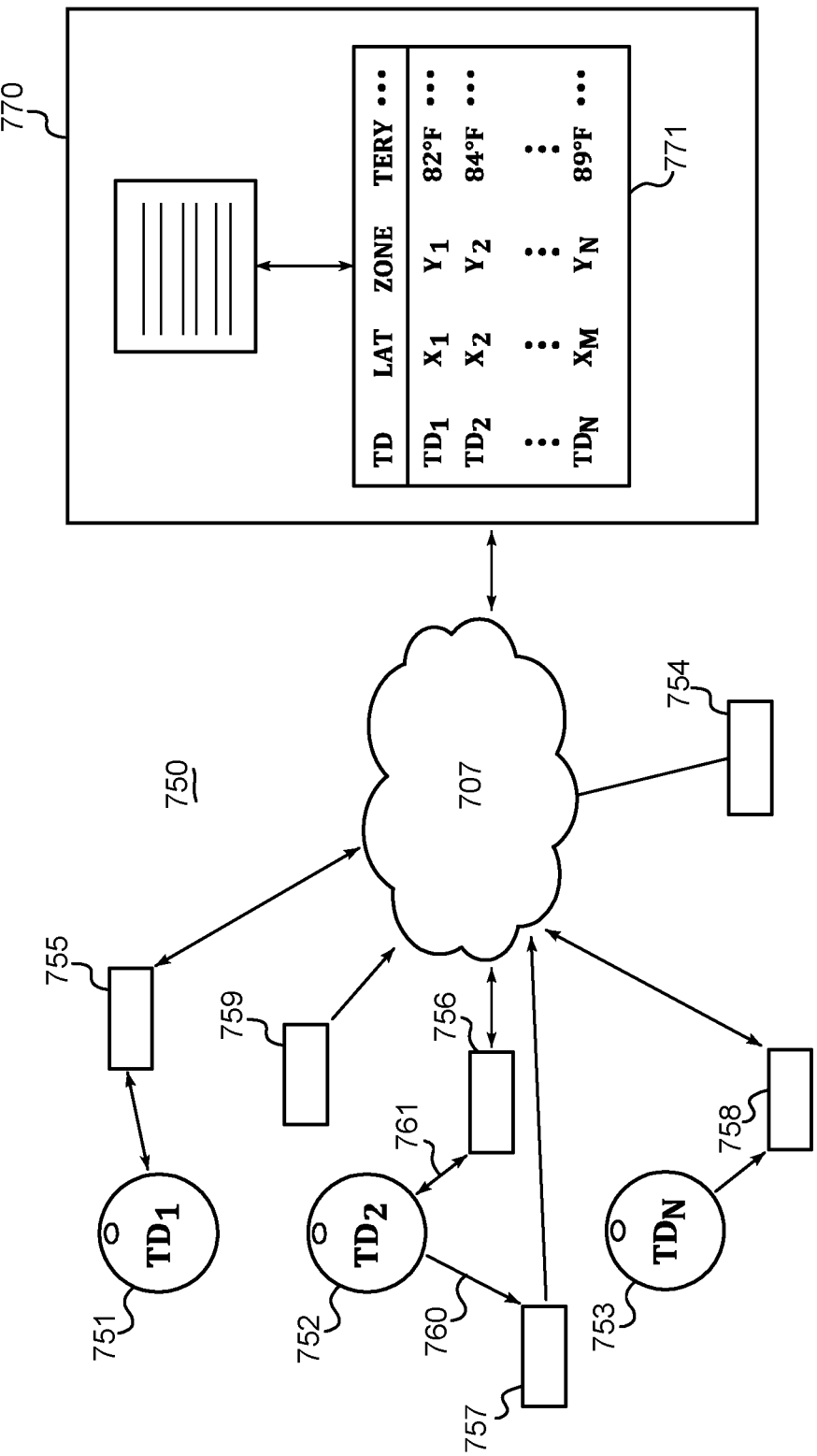

FIGS. 7A, 7B and 7C are schematics of alternate sensor networks formed from beacons of the invention. In FIG. 7A, a direct association is established between a deployment of three beacons TD1, TD2, TD3 (701, 702, 703) and a host device, here a first smartphone 502. Any network alerts are conveyed to the cloud from the smartphone, or may be shared with a second smartphone 503 of a friend. In this system or network 700, each beacon is paired with a host device 502. While a smartphone is shown, the host device may be a computer, a tablet, or other personal computing device. The host device has a transceiver for establishing a wireless connection to the cloud, representing here a portal to the Internet. In this patent, a symbol depicting a cloud and the reference number 707 are metaphors for the Internet itself, for local area networks (LANs), for wide area networks, and for individual sites on the Internet where users may access cloud computing, and store and retrieve programs and data. The host device 502 may create one or more alerts (also termed "notifications") based on the relative location of the host device, the beacons, and any sensor data (including input "stimuli" generally) received from the beacons. For example, this system 700 may be used to find a lost object having an associated beacon, to set an alert for when an object, pet, or person bearing a beacon moves into or out of one or more predetermined proximity ranges, and to pair alerts with locations or motions of the beacons (701, 702, 703) in this simple deployment. The owner-user may share information transmitted by the beacons with others, and may control or share control the beacons. Accordingly, in another user with a second host device 53 may use the same beacons to establish alerts on the second host device that are different from those alerts created by the first user on host device 502.

The system 700 may remind a user to take along needed personal items before leaving a current location. Beacons would be attached to a key ring, a laptop or tablet computer, a briefcase, a purse, a wallet, a suitcase, a backpack, or other personal items. The user will carry the tracked items during travel. If the user departs a location and forgets one of the tracked items, an alert will sound on a host device 502 alerting the user not to leave without it. Such alerts may be paired to specific locations so that they are only triggered when and where the user wants.

Inertial sensors may be included to refine the alerts. If all personal items in a cluster are moving in the same direction with the same inertial velocity as the user, then reasonably the user is carrying them. But if one item is stationary, or is moving in another direction, the user is quickly alerted to backtrack and find.

The core host device 502 of each beacon has a clock. The beacon signal in any signal from a sensor in the beacon may be tagged with time sent. The clock may also be used to extend the life of the battery 527. If battery voltage is sensed as low, the beacon may be put in power saving mode, including a command to power up when the user begins moving or an ambient light is detected. Thus sensor data can serve in making contextually relevant notifications to a user. Here the user's device and beacon constellation power up and fire off an alert if anything is left behind.

The system 700 may also generate an alert when an item has returned. For example assume a beacon is attached to an automobile operated by another member of the user's household. When the driver of that automobile returns home, the beacon will trigger an alert in the user's host device and may push a notification to the user that the automobile is now in the driveway. Similarly, the return of the cat looking for dinner can be announced to the household through a shared user alert.

Another feature of each beacon is the capacity of the owner of the device to share device information or control, or both, with others. For example a remote user with host device 503 and was shared privileges may access the cloud Internet 707 and use the recorded motion information in a beacon to generate a map display showing an icon tracking that motion on the map. In some embodiments, the shared users are designated as "friends" of one or more beacons that are generally under control of the owner of the beacon deployment. As will be explained later, an owner may voluntarily transfer control of a beacon to another authorized user or simply relinquish control to any other authorized user within range of the wireless device. An authorized user is, at a minimum, a user who has a host device configured to operate an application having an instruction set for monitoring and controlling the designated beacons. In other embodiments, authorized users are registered with the central user site that may be accessed through a passworded and secure browser communications link.

FIG. 7B illustrates a more complex network. Three beacons TD1, TD2, TD3 (701, 702, 703) and a host device, here a "hub" 704 are linked through an internet cloud connection to any of a personal computer 703, a mobile tablet 705, or a smartphone 502.

FIG. 7C is an exemplary network 750 including a cloud-based server 770. An owner of multiple beacons (751, 752, 753) operates a host device 754 that has two-way communication via cloud/Internet 707 with the beacons. Server 770 is also into a communication with a cloud/Internet 707. The server includes one or more databases 771 that keep records on owners, users, and each beacon. For a user of the network 750, the database 771 would show the devices owned by the user or those devices for which the user had granted or received one or more privileges, or are marked for public access, the identity of each beacon that is owned or subject to a privilege granted or received, the environmental sensor data reported by each sensor of each beacon, including and not limited to the timestamp when the data was received and the location of the host device that receives the data. At any time, host device 754 may be used to view tabulated chronological information on the location and sensors of each beacon in the deployment, including the last known location of the beacon and when the last known location was recorded in the database 770.

The owners host device 754 may be beyond the range of radio transceivers in the beacons. A number of other host devices (755, 756, 757, 758, 759) may be within range of one or more of the transceivers of the beacons. Each beacon uses its internal radio to broadcast a periodic beacon signal tagged with the identity of the beacon and environmental data from the sensors associated with each beacon. Each host device (755, 756, 757, 758, 759) receives proximate beacon broadcasts and relays any information in the broadcasts to the cloud/Internet 707, including the GPS location of the host device. These remote host devices do not need permission from the owner of the beacons to receive and forward the contents of the beacon broadcasts. As long as a common program application is running, each host device will receive the beacon signal. The beacon signals are public and in the open. Retransmission of beacon data to the server 770 imposes no hardship or penalty because each host device, most commonly a smartphone, likely transmits its own beacon locator signal to a cellular phone network or a local or wide area network.

Thus in this embodiment, the ad hoc network consisting of all host devices may be used to locate misplaced items that are beyond the range of an owners host device 754. An owner may access the database 771 and mark one or more of the owned devices as "lost". To illustrate, assume that beacon 752 is attached to a valuable piece of property, for example a tablet computer. Assume another user's smartphone 757 passes within receiving range 760 of the beacon signal from beacon 757. The identity of the lost device 752 and its approximate GPS location will be relayed 761 through host device 756 to the cloud/Internet and recorded in the database 771. An alert may be issued to the owner reporting the general location of the lost device, such as in a shared workspace or cafeteria. The approximate location can be displayed on a suitable mapping application such as Google Maps or MapQuest to provide the owner with local streets or landmarks where the owner may look for the lost device.

The database has numerous uses. Beacons may be distributed over a large geographical area in which each beacon is in communication with a hub (such as shown in FIG. 7B). The tracking devices may be located at one or more known locations, or the hubs may provide GPS data. The sensors on the beacons will report contextual data such as temperature, air pressure, and humidity via the hubs, providing a current weather database characteristic of the geographical area.

There are a virtually unlimited number of sensors that can be packaged with a beacon to provide trigger alerts or to render notifications more contextually relevant to a user's needs. Each beacon has a multifunction button 630 and may have one or more sensors (505, 506, 507). The button and each sensor may generate a trigger signal. Trigger signals may be combined in any number of combinations and/or sequences of trigger signals to generate particular trigger signals depending upon the occurrence of predetermined combinations and/or sequences of trigger signals. The beacons and host devices may also generate one or more responses or alerts upon receipt of trigger signals or combinations thereof.

Multifunction button 630 may be pressed one or more times to generate one or more trigger signals. Two or more sequential pressings of the button 630 or an alternate trigger signal. The button may be held down to generate a long-duration trigger signal or promptly released to generate a short trigger signal. A combination of long and short duration signals may also be used as a trigger signal.

For embodiments having a multi-axis motion sensor, any motion or combination and/or sequence of specific types of motion (such as a gesture) may be used to generate trigger signals. For example when a beacon 751 is used to secure a door or window, any motion of the sensor may be a trigger signal. In other embodiments, specific user-defined spatial displacements are received and stored in the host device as trigger signals for a response. For example, moving a beacon from left to right, shaking the beacon up and down, moving the beacon to define a letter, such as the letter"L", or moving the beacon to define a shape such as a circle or square, are but a few custom motions. The shapes and letters may be paired with the click of the button 630 to indicate the start of a motion and a second click when the custom motion is completed. The control apparatus would remember the click from start to stop and the motion between the clicks.

Range is another trigger for the tracking devices. On the host device the user may define one or more ranges for generating responses including alerts. One potential use is keeping apparent advised of the relative location of a child while shopping in a store. Different responses or alerts may be given at different ranges is the distance between the child and the parent increases or decreases. In the hub system of FIG. 7B, a trigger may be given when a beacon leaves or enters the hub.

Location is still another trigger. In some embodiments, the beacon may carry its own GPS module and broadcast its latitude and longitude coordinates. In other embodiments, the tracking device may rely upon the GPS coordinates of any beacon that participates in systems such as shown in FIGS. 7A-7C and is within range. In still other embodiments, the location of one host device may be paired with the range of one tracking device. For example in the basic system shown in FIG. 7A, host device 502 provides its location using a built-in GPS function and pairs that location with its range to beacon 701. A user may have an alert triggered when the distance between host device 502 and beacon 701 exceeds a predetermined distance selected by the operator. A user can also set an alert that is only active at a "home" location to remind the user to take a laptop (to which the beacon 702 is attached) when the user leaves home.

Time is another trigger signal. As explained above, time of day may be combined with other trigger signals to enable or disable one or more alerts, such as enabling a motion alert during the night but disabling the alert during the day under control of a photosensor embedded in a beacon.

Other trigger signals and their combinations and/or sequences are possible with added sensors. The tracking devices of the embodiments of the invention may use any of a vast number of sensors including and not limited to sensors for motion. Distance, velocity and acceleration, temperature, pressure, magnetic fields, gravity, humidity, moisture, smoke, vibration, pressure, light, electrical fields, ionizing and non-ionizing radiation, cosmic rays, and other physical aspects of the external environment; analytes for chemical or biological substances including and not limited to sensors for detecting toxic compositions such as carbon monoxide, carbon dioxide, methane, and other hazardous or poisonous components. The tracking devices may be worn as badges by personnel to detect ambient analytes and physical parameters. The data collected by the tracking device may be sent to the data collection center 58 where others can analyze it and provide responses or alerts to the personnel wearing the tracking devices. Also envisaged are sensor inputs that self-monitor the beacon, such as button press sensor indication or a battery voltage indication.

The control apparatus has a program that allows the user to create custom trigger signals including combinations and/or sequences of individual trigger signals. The control apparatus, the tracking device or both may generate one or more responses to a trigger signals or a combination of trigger signals. The tracking device, the control apparatus or both may give responses or alerts.

The foregoing embodiments of beacons provide audible and visual alerts, but may also vibrate upon receipt of a command or trigger signal. In the embodiments described above, the beacons and the host device may establish a remote control system between themselves to cause one of the system components to execute a function upon receipt of a predetermined command or trigger signal from the other component. For example a custom motion trigger signal of the beacon may remotely control the host device to take a picture, to send a message via email or SMS, to make a phone call to a predetermined party, and combinations thereof, such as take and send a picture to a predetermined party or group of predetermined friends.

Figure 8A:
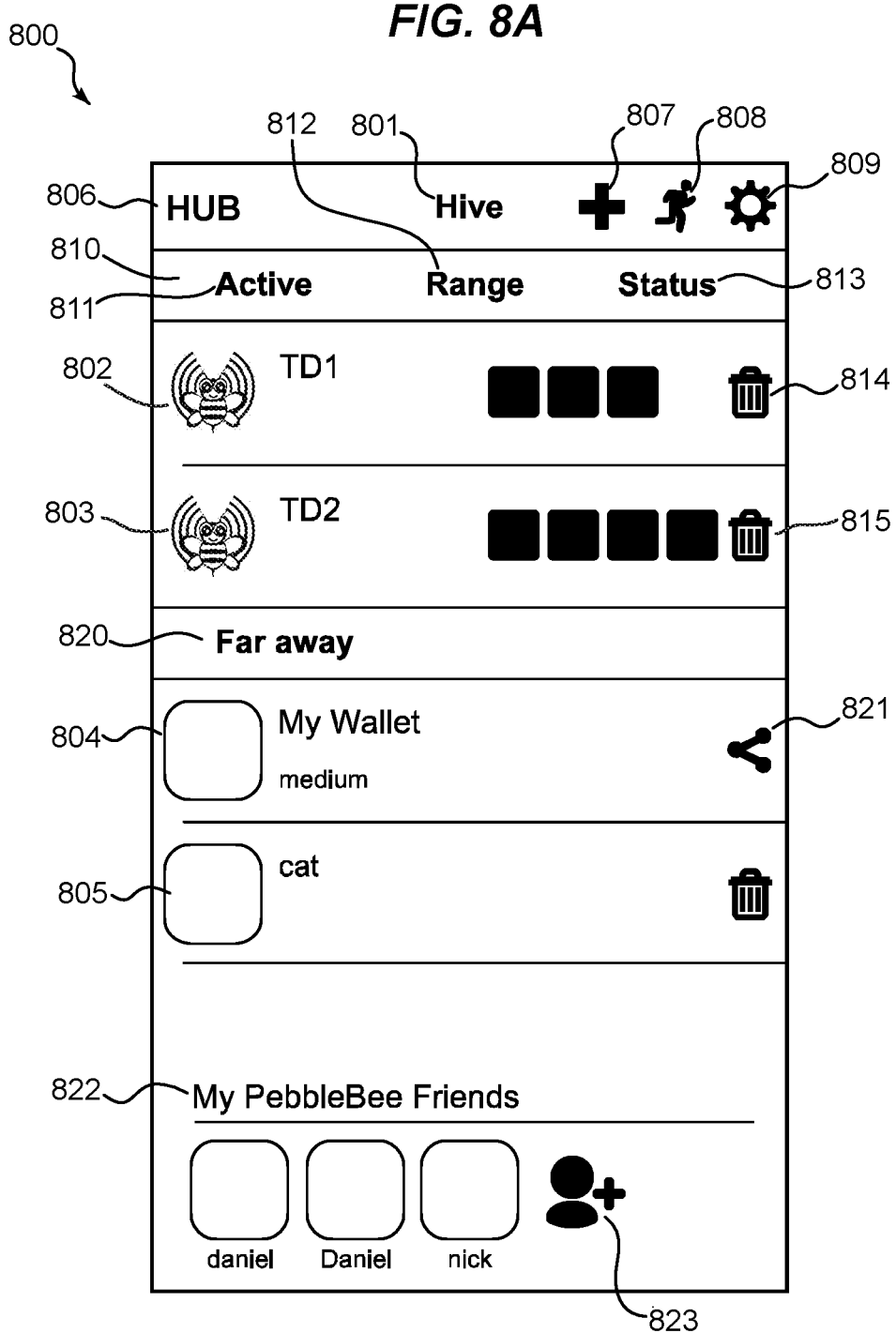

While not descriptive of the range of applications which may be implemented on the beacons and modified comm protocols of the invention, a representative control program or "application" to be operated on a receiver, hub or host device is shown in the following screenshots, FIGS. 8A, 8B and 8C. First in FIG. 8A, the owner has logged in and is shown a screenshot 800 having a hub icon 801 and status and control indicia. A hub is a group of beacons; here four beacons are shown and are tagged as TD1 802, TD2 803, MyWallet 804, and CAT 805. In the top banner 806 there are control buttons 807, 808 and 809, respectively, for enabling the host device to receive and send Bluetooth transmissions, to release one or more beacons from the host device, and to set general settings for the beacons. Banner 810 defines columns for active devices 811, their range 812, and their status 813. For example, beacon TD1 has a range indicated by three bars and a status showing a can 814. The can 814 indicates that the device is under control of the host device but may be released if so desired. In the next row, another tracking device TD2 is shown to be closer as indicated by the four status bars, and is also under control of the host device as indicated by can 815. In the hub, there are several more devices, which are noted to be "far away". See the Faraway banner 820. Faraway devices include a beacon associated with MyWallet 804, and another beacon associated with a cat (805, the family pet). Note that MyWallet has a "Y-shaped" network symbol 821 designating shared use with another user. Near the bottom of the screenshot, a banner 822 shows Friends. A friend is any other user who has defined permissions to control one or more of the beacons. The icon 823 indicates a button that may be pressed to add additional friends. To the left are shown existing friends.

Devices receiving overloaded beacon broadcasts will extract the contextual data from the frames and modify the receiver according to associations unique to the application software on the receiver or on a cloud-associated device associated with the receiver.

The use of beacons to track small moving thing such as pets underscores the need for a small beacon device necessarily having limited resources. Typically the beacon will have a radio on a chip, limited memory resources, and a small microcontroller. The antenna will be a ceramic on card chip or will be a wire antenna folded to reduce its footprint. MIMO devices may have several antennae but will be light and compact. The greatest mass in the device may be the battery, which will typically be a coin cell battery or supercapacitor. A very simple user interface may be provided but setup is typically done with the aid of a host device or a computing device having a keyboard and other resources not provided in the beacon. The sensor may be integrated into the radio chip, or may be provided separately with a suitable digitizer and controller for encoding the sensor output into the radio emission bitstream with proper framing. The controller may also multiplex one or more sensor feeds if needed and can control the refresh rate for each sensor.

Figure 8B:
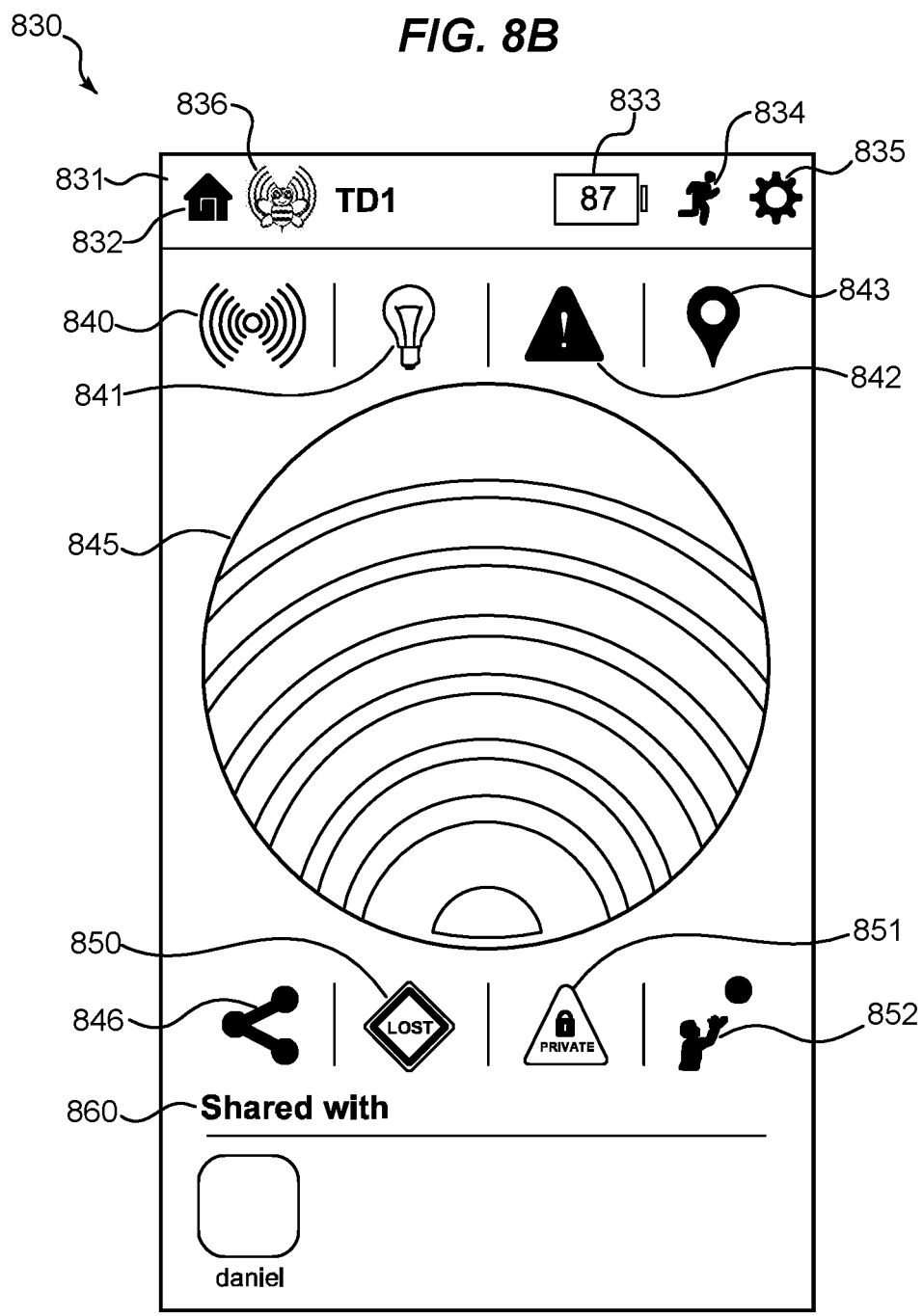

FIG. 8B shows screenshot 830 of a control screen for beacon TD1. Top banner 831 has a number of command and status icons. Hub icon 832 returns the user to the previous screen. Battery icon 833 shows current battery status. Icon 834 is the release symbol, and gear icon 835 is used for adjusting general settings. Bee icon 836 advances the user to a screen configured to name and set up descriptors for the beacon TD1.

Below banner 831 are another set of icons for immediate alerts, paired alerts, and locations for the beacon TD1. Icon 840 when touched may be enabled to test a loudspeaker in the beacon. Icon 841, a light bulb, when touched will cause the tracking device LED to flash rapidly. If the tracking device is equipped with a vibrator another symbol may be provided to indicate and test the vibrator. Icon 842 allows the user to set up alerts; alerts may include a combination of conditions that are context dependent. Icon 843 activates a mapping function that allows the user to acquire and display a map of the current location of the beacon TD1.

While these functions are enabled in a beacon having a two-way radio and sufficient low resource computing power to respond to simple commands, other beacons of the invention may operate in a strictly transmit mode, transmitting beacon identifiers, major and minor values, and at least one bit, and optionally a plurality of bits, associated with a variable context that are overloaded into the transmission. Interpretation of this bit or plurality of bits is dependent on the software in the application provided to the receiving device.

Indicia 845 graphically represent the rangefinder built into the top cover of the tracking device. The concentric arcs radiating from the bottom center represent the relative range between the host device and the beacon. On the display the user will see different colors gradually filling in from bottom to top as the handset comes in closer proximity to the beacon TD1. Below the rangefinder, the user has a number of selectable options. The user may select icon 846 in order to share the device with another user. By selecting icon 850 the user may designate TD1 as lost. Selecting icon 851 locks the beacon as private and only the user may see the data generated from TD1 as well as its location. Icon 852 allows the user to release all control of the beacon, so at that point the tracking device may be claimed and controlled by any other authorized user. The bottom banner 860 indicates other users with whom the current user has shared the beacon. 29

Other screens display general settings for beacon TD1. By clicking on the gear icon 835, the user may enter particular information about the beacon. For purposes of illustration, the user may enter a picture of the object, person or pet being tracked, and may assign the object a name and a description.

FIG. 8C illustrates a program screenshot 860 for controlling Alert settings. Pressing icon 842 brings the user to the screen. Under general settings 861, the user may then select the kind of alert (audio, light, vibration) and may also pair the alert with other conditions. The screen is also used to establish remote control between a host apparatus and TD1. In some instances, the beacon (400, having bidirectional radio) may control the host apparatus 502 and vice versa. If desired, the user may have an alert show up on a host apparatus 502 such as the user's smartphone. In addition, the user may operate a loudspeaker on the beacon. The user may also ask for an alert when a voltage sensor outputs that the battery is low. In a second section 862, other alerts may be set for proximity detection. For example, under Distance alerts 864, the user has the option to set alerts before when the beacon leaves the hub (i.e., outside the range of the host apparatus); when the beacon is nearing the edge of the active range, and when the beacon returns to the hub. Controls 880 for the multifunction button allow the user to find the host device 502 or to set the multifunction button to operate the host device, such as a smartphone, to take a picture 888. In other embodiments the multifunction button or a text message to a predetermined party. Further alert settings 890 are dependent on conditions such as location pairing. In this case, the alert is conditioned upon the tracking device being at work 891 or at home. As shown here locations are identified by latitude 892 and longitude 893. Location may also be refined relative to other beacons in the area, those beacons having known coordinates, as may be termed "crowd-sourced" determination of location, and having a step for mapping any beacon on a map of one or more other beacons having a mappable location, the mappable cluster of beacons having a relative location to each other such that if the location of at least one of the cluster of beacons is known by its coordinates, then the location of any other beacon in the cluster can be inferred.

Figure 9:
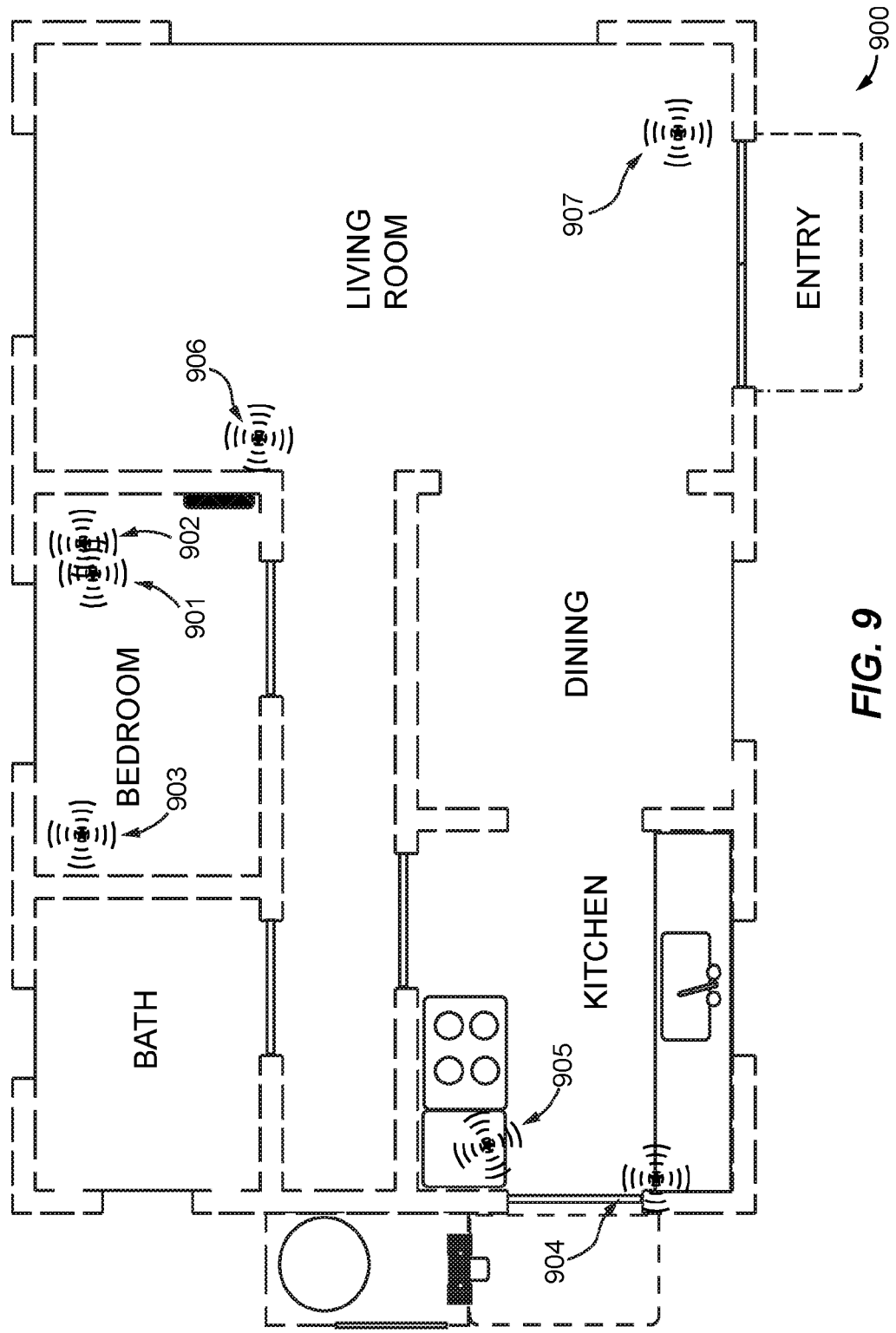
FIG. 9 is a plan view of a household containing multiple beacons associated with personal possessions, where the exemplary beacons are enabled to monitor household conditions and notify an owner of any adverse conditions.

FIG. 9 is a plan view of a household 900 containing multiple beacons associated with personal possessions or particular locations, where the exemplary beacons are enabled to monitor household conditions and notify an owner of any adverse conditions. Some beacons are used to tag personal items such as a wallet, car keys (901, 902), and backpack (904). Other beacons are used to detect motion, such as of a backdoor (903). Yet other beacons are used to report a room temperature or temperature in the refrigerator 905 or a smoke alarm battery voltage 906. One beacon is attached to the family dog 907 and reports motion and position of the dog. Thus, this deployment of beacons represents a constellation of sensors having multiple complementary uses, all of which are accessible to the owner as organizational aides.

In preferred methods of use, the deployment of beacons may trigger notifications or actions depending on location, particularly in the context of navigation where proximity of a host receiver is known relative to a cluster of beacons. In another example, a user enters a room having a beacon TMx, detects the beacon and receives associated temperature data. Room temperature is detected as low. So the application can push a notification to the receiver device, or code in the application in the receiver can include instructions to turn up the heat to a pre-defined comfort level and to turn on the lights or an MP3 music track in a compatible device, for example. The receiver can identify the user's location from the beacon and can broadcast this information to a cloud service if desired, so as to obtain other special services. A substantial body of literature on cloud-mediated services is known in the art, but a simple beacon-mediated trigger or notification system has been needed to simply and improve delivery. By overloading contextual data on the comm protocol, substantial improvement is achieved and is an advance in the art.

As above, the sensor data, including input stimuli generally, is overloaded into the frames of a standardized beacon transmission and parsimoniously broadcast at defined intervals. The data may be read by a compatible portable device such as a smartphone in proximity to the household, or may be uploaded from a host device or other computing device with cloud access, so that the data and any accompanying notifications can be downloaded remotely or accessed through a browser.

Figure 10A:
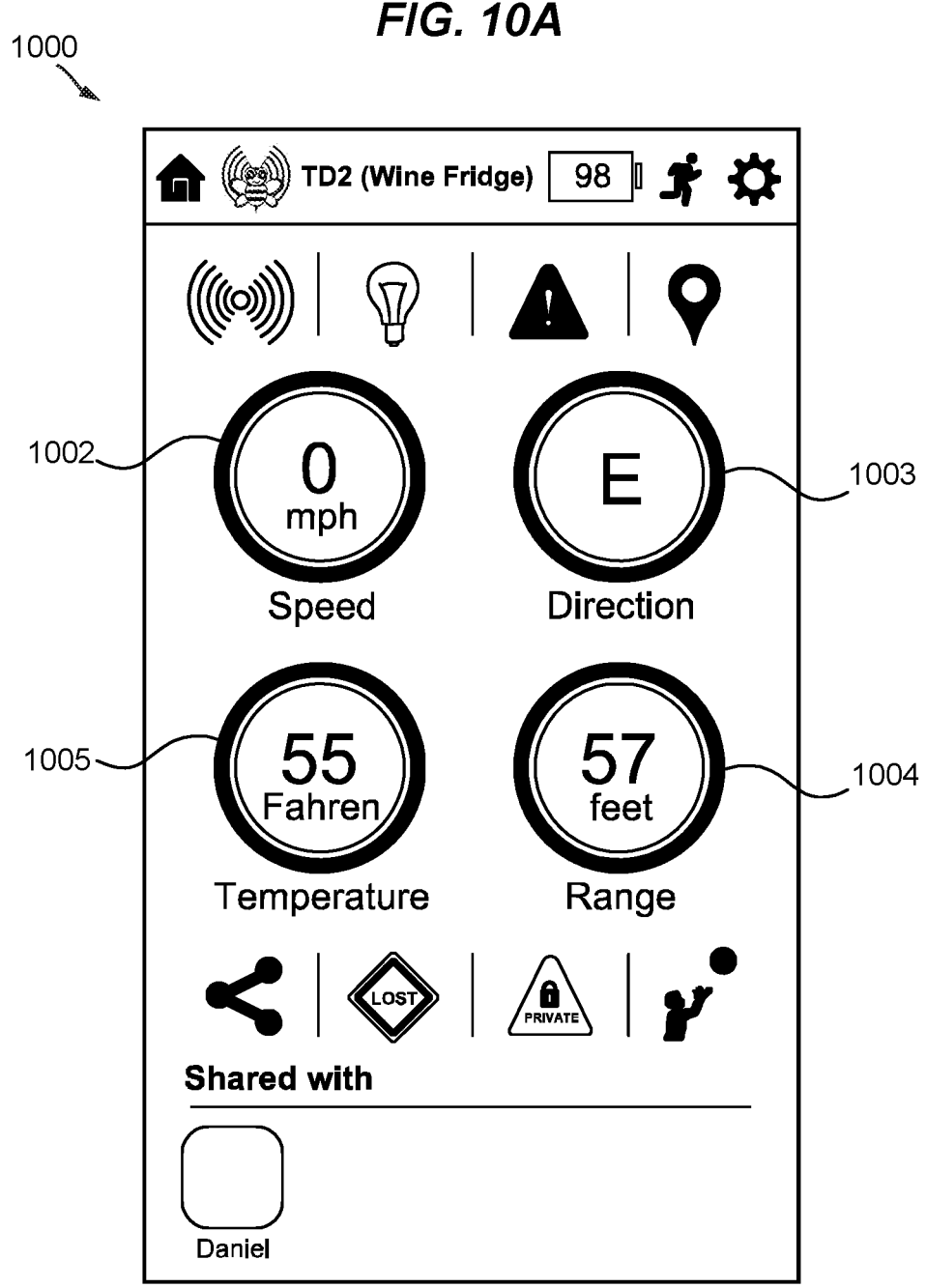
FIGS. 10A and 10B illustrate a graphical user interface operative in managing a temperature notification system wirelessly operated from an exemplary beacon of the invention.
Figure 10B:
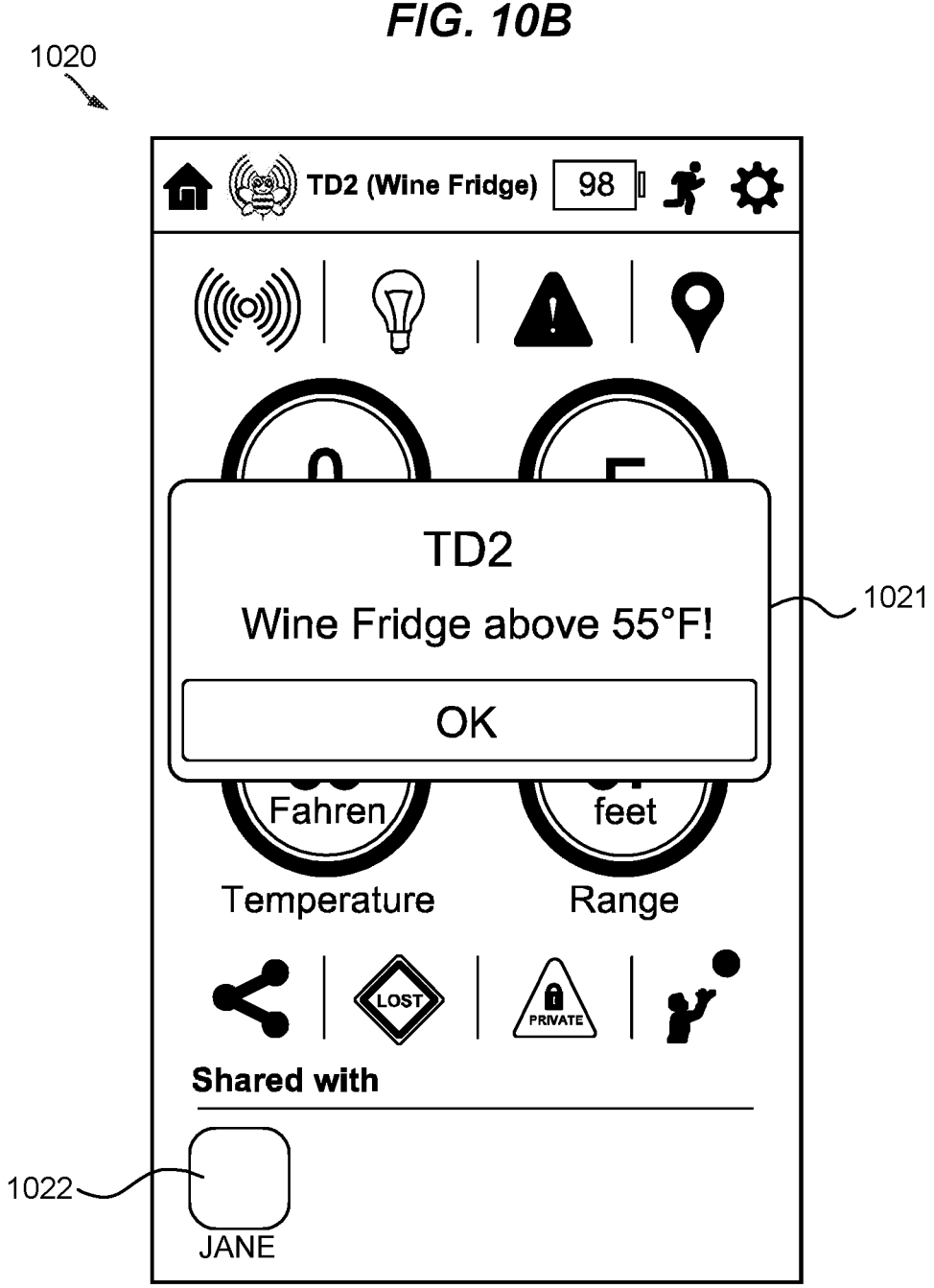

FIGS. 10A and 10B illustrate a graphical user interface operative in managing a temperature notification system wirelessly operated from an exemplary beacon of the invention. Screenshots 1000 and 1020 show alternate views of a beacon with a nine axis accelerometer and a temperature sensor. The beacon TD2 is used to monitor the temperature inside a wine refrigerator. Nevertheless the screenshot displays the nine axis motion data for beacon TD2, including its speed 1002 and direction 1003 as well as its range 1004 and the temperature 1005. A temperature alert is set to 55° F. If the condition of the temperature changes and rises above 55° F., and alert is sent to the host device.

The alert appears on screenshot 1020 in the display of the control apparatus with the alert banner 1021 showing that the TD2 wine fridge is above 55° F. Alert 1021 on the control apparatus appears not only on the display, but can also trigger a vibration of the control apparatus and/or an audible signal. In this way, environmentally sensitive and relevant information is conveyed to the owner of the beacon wirelessly, along with contextual information that makes temperature relevant. For this purpose the motion data is ignored. However if the intent were to monitor the temperature of the wine on the way home from the store, then temperature and motion would be relevant, providing a rough indication of the time it will take to get home and any warming that will occur, thus enabling the owner to turn on the car's AC system if needed to protect valuable commodities. In this case, the alert is also shared with a friend 1022, who will also receive notifications if an alert is issued.

EXAMPLE I

In a first example, a beacon is mounted on a backdoor and includes a motion sensor module operatively linked to a BTLE radio emission module. The radio emission module is programmable and includes instructions for encoding sensor output of the motion detector into the frames of a Bluetooth signal to a hub, which in turn relays the sensor data to a browser-accessible website that includes the capacity to generate notifications to a registered user. A push notification is made to a smartphone for which the necessary permissions have been granted. The owner of the smartphone is alerted to a possible intruder by the alert, and enters an instruction to activate cameras in the house so as to surveil the premises. If an intruder is seen, the user calls police dispatch, takes video and photographis of the intruder, and returns home to meet the police.

The flexibility of the communications protocol is apparent in that a sensor having smoke detection capability could function to generate a notification in an essentially identical way in the event of a fire at the neighbor's house. Microphones detecting sirens likewise would be interpreted to actuate a notification.

EXAMPLE II

In another example, a cat receives a collar with a built-in beacon. The collar includes a noise detector. When the cat makes repeated cries, the sensor integrates the signal over one minute and determines that a notification should be triggered. The owner of the cat receives an alert showing the approximate location of the cat and the level of the disturbance. The owner returns home as regularly scheduled to feed the cat.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

We claim:

1. A method for overloading data in a digital radio message, which comprises
   (a) providing a radio beacon with a radio transmitter, a processor, an instruction set for operating said processor, a sensor or sensors, and memory and digital circuitry for operatively coupling said processor with said sensor or sensors and said radio transmitter;
   (b) as preprogrammed by said instruction set and executed by said processor; formatting a bluetoothed message having a bitstring of a defined bit order and length compatible with a frame or frames of a bluetoothed radio protocol;
   (c) wherein overloading of data is executed by inserting a digitally encoded data output from said sensor or sensors into said bitstring by a process of bitwise substitution therein, without adding to the length or number of bits in said bitstring, thereby defining an overloaded beacon message; and,
   (d) broadcasting said overloaded beacon message according to said bluetoothed radio protocol, said overloaded beacon message having overloaded data therein.

2. The method of claim 1, wherein said bitstring is a concatenated string consisting of a UUID frame, a major frame, and a minor frame.

3. The method of claim 2, wherein said digitally encoded data output is inserted into said UUID frame by said process of bitwise substitution therein at a least significant bit, a most significant bit, or any bit or bits of said frame.

4. The method of claim 2, wherein said digitally encoded data output is inserted into said major frame by said process of bitwise substitution therein at a least significant bit, a most significant bit, or any bit or bits of said frame.

5. The method of claim 1, wherein said digitally encoded data output is inserted into said minor frame or any combination of said UUID frame, major frame, and minor frame, by said process of bitwise substitution at a least significant bit, a most significant bit, or any bit or bits of said frame or frames.

6. The method of claim 1, wherein said digitally encoded data output is data output from a sensor selected from temperature, light intensity, smoke, voltage, sound, motion, displacement, acceleration, humidity, pressure, radiation, compass direction, daylight level, windspeed, traffic level, noise level, NOX level, and sound identification sensor, or a combination of sensors therefrom.

7. The method of claim 1, wherein said sensor is a radio beacon self-reporting sensor selected from low battery sensor, overheat sensor, location sensor, or button-press sensor.

8. The method of claim 1, which further comprises:
   (a) receiving said overloaded beacon message on a smart device, said smart device having an application installed therein, wherein said application is configured for recognizing a UUID frame of said bluetoothed radio message when received by said smart device; and,
   (b) extracting and decoding said overloaded data in said message.

9. The method of claim 8, which comprises executing an instruction on said smart device according to a rules-based decision tree and permissions based at least in part on said overloaded data, wherein said instruction is selected from
   (a) making a notification or a display;
   (b) mapping said overloaded data on virtual map;
   (c) waking up a program;
   (d) activating or deactivating a permission;
   (e) taking an action;
   (f) adding a timestamp to said data;
   (g) adding a geostamp to said data;
   (h) forwarding said data;
   (i) causing a remote device to take an action; or,
   (j) a combination thereof.

10. The method of claim 9, wherein said radio beacon is mobile, comprising adding a timestamp; adding a geostamp; and plotting said overloaded data on a path taken by said mobile radio beacon on a virtual map.

11. The method of claim 9, wherein said radio beacon is stationary, comprising adding a timestamp; adding a geostamp; and plotting said overloaded data on a virtual map.

12. The method of claim 11, comprising aggregating said overloaded data from a plurality of beacons, thereby defining an aggregated data set collected from a sensor net, a cluster, or a deployment of beacons, and plotting said aggregated data set on a virtual map of said plurality of beacons.

13. The method of claim 8, comprising inserting said digitally encoded data output of said sensor or sensors into said UUID frame at a most significant bit; thereby generating an encoded UUID; broadcasting said overloaded beacon message, at a smart device, receiving and recognizing said UUID frame; decoding said overloaded data and an encoded UUID; and executing an instruction on said smart device according to a rules-based decision tree and permissions based at least in part on said overloaded data and said encoded UUID.

14. The method of claim 8, further comprising
   (a) providing a smart switch on said radio beacon, said smart switch having an electrical connection to said digital circuitry and having a first and second output to said processor as defined by a first state and a second state of said switch,
   (b) wherein said switch may be toggled between a first and second state by a user and said states define a first and second digital sensor output to said processor;
   (c) inserting said digital sensor output into said bitstring by a process of bitwise substitution therein, without adding to the length or number of bits in said bitstring, thereby defining an overloaded beacon message;
   (d) receiving said overloaded beacon message on said smart device and extracting and decoding said digital switch sensor output overloaded therein;
   (e) according to a rules-based decision tree and permissions based at least in part on said digital switch sensor output and said UUID, executing an instruction selected from:
      (i) making a preset notification or display;
      (ii) waking up a program;
      (iii) activating or deactivating a permission;
      (iv) taking an action;
      (v) forwarding said output;
      (vi) causing a remote device to take an action; or,
      (vii) a combination thereof.

15. The method of claim 1, which further comprises:
   (a) receiving said overloaded beacon message on a smart device, said smart device having an application installed therein, wherein said application is configured for recognizing a UUID frame of said bluetoothed radio message when received by said smart device;
   (b) forwarding said radio message to a cloud host or administrative server; and,
   (c) extracting said digitally encoded data output overloaded therein.

16. The method of claim 15, which further comprises executing an instruction on said cloud host or administrative server according to a rules-based decision tree, permissions, and data from one or more databases, wherein said instruction is based at least in part on said overloaded data, wherein said instruction is selected from
- (a) sending a notification to at least on smart device;
- (b) presenting a display on at least one smart device;
- (c) mapping said overloaded data on a virtual map displayable on at least one smart device;
- (d) waking up a program on at least one smart device;
- (e) activating or deactivating a permission on at least one smart device;
- (f) causing a remote device to take an action;
- (g) adding a timestamp to said data;
- (h) adding a geostamp to said data;
- (i) aggregating said overloaded data; or,
- (j) a combination thereof.

17. The method of claim 16, wherein said radio beacon is mobile, comprising adding a timestamp; adding a geostamp; and plotting said overloaded data on a path taken by said mobile radio beacon on a virtual map, wherein said virtual map is displayable on at least one smart device.

18. The method of claim 16, wherein said radio beacon is stationary, comprising adding a timestamp; adding a geostamp; and plotting said overloaded data on a virtual map, wherein said virtual map is displayable on at least one smart device.

19. The method of claim 18, comprising aggregating said overloaded data from a plurality of radio beacons, thereby defining an aggregated data set collected from a sensor net, a cluster, or a deployment of beacons, and plotting said aggregated data set on a virtual map of said plurality of beacons, wherein said virtual map is displayable on at least one smart device.

20. The method of claim 19, which comprises: aggregating said digitally encoded data output from a plurality of radio beacons, thereby defining aggregated sensor data, said plurality of radio beacons defining a sensor net, and executing an instruction according to a trend detected in said aggregated sensor data, wherein said instruction is selected from:
- (a) sending a notification to at least on smart device;
- (b) presenting a display on at least one smart device;
- (c) mapping said overloaded data on a virtual map displayable on at least one smart device;
- (d) waking up a program on at least one smart device;
- (e) activating or deactivating a permission on at least one smart device;
- (f) causing a remote device to take an action;
- (g) adding a timestamp to said data;
- (h) adding a geostamp to said data;
- (i) aggregating said overloaded data;
- (j) acting on a community defined executable function; or,
- (k) a combination thereof.

21. The method of claim 15, comprising inserting said digitally encoded data output of said sensor or sensors into said UUID frame at a most significant bit; thereby generating an encoded UUID; broadcasting said overloaded beacon message, at a cloud host or administrative server, receiving and recognizing said UUID frame; decoding said overloaded data and an encoded UUID; and executing an instruction according to a rules-based decision tree and permissions based at least in part on said overloaded data, said decoded UUID, and any database or permissions associated with said decoded UUID.

22. The method of claim 15, further comprising
- (a) providing a smart switch on said radio beacon, said smart switch having an electrical connection to said digital circuitry and having a first and second output to said processor as defined by a first state and a second state of said switch,
- (b) wherein said switch may be toggled between a first and second state by a user and said states define a first and second digital sensor output to said processor;
- (c) inserting said digital sensor output into said bitstring by a process of bitwise substitution therein, without adding to the length or number of bits in said bitstring, thereby defining an overloaded beacon message;
- (d) receiving said overloaded beacon message on said cloud host or administrative server and extracting and decoding said digital switch sensor output overloaded therein;
- (e) according to a rules-based decision tree and permissions based at least in part on said digital switch sensor output and said UUID, executing an instruction selected from:
    - (i) sending a notification to at least one smart device;
    - (ii) presenting a display on at least one smart device;
    - (iii) waking up a program on at least one smart device;
    - (iv) activating or deactivating a permission on at least one smart device;
    - (v) causing a remote device to take an action;
    - (vi) adding a timestamp to said data
    - (vii) adding a geostamp to said data;
    - (viii) aggregating said overloaded data; or,
    - (ix) a combination thereof.

23. The method of claim 22, comprising providing a multiplicity of said smart switches or a smart switch having more than two states, each said switch adding multiple states to an array of selectable states.

24. The method of claim 1, wherein said frame or frames of said radio beacon message are compatible with a standard protocol for radio beacon messaging, and broadcasting said overloaded beacon message to a compatible receiving device, each message overloaded with said digitally encoded data output from said sensor or sensors.

25. The method of claim 1, wherein said frame or frames of said radio beacon message are compatible with a standard protocol for radio beacon messaging, wherein said standard protocol is selected from:
- i) a bluetoothed low energy interface standard;
- ii) an ibeacon communication standard;
- iii) a beacon frame format of the 802.11WiFi Interface standard;
- iv) a little endian or a big endian standard;
- v) a beacon communications protocol that is not violated by said overload of data;
- and broadcasting said overloaded beacon message to a compatible receiving device, each message overloaded with said digitally encoded data output from said sensor or sensors.

26. The method of claim 1, wherein said frame or frames of said radio beacon message are compatible with a standard protocol for radio beacon messaging, and broadcasting said overloaded beacon message to a compatible receiving device, each message overloaded with said digitally encoded data output from said sensor or sensors, wherein said compatible receiving device is selected from:
- i) an iOS device;
- ii) an android device;
- iv) a wireless receiver; or,
- v) a smart receiver.

\* \* \* \* \*